US008615544B2

(12) United States Patent
Raju et al.

(10) Patent No.: US 8,615,544 B2
(45) Date of Patent: Dec. 24, 2013

(54) SYSTEM AND METHOD FOR UNLOCKING A DEVICE REMOTELY FROM A SERVER

(75) Inventors: SriramKumar Raju, Bangalore (IN); Puneet Kaushik, Ghaziabad (IN)

(73) Assignee: Wyse Technology Inc., San Jose, CA (US)

( * ) Notice: Subject to any disclaimer, the term of this patent is extended or adjusted under 35 U.S.C. 154(b) by 125 days.

(21) Appl. No.: 13/035,879

(22) Filed: Feb. 25, 2011

(65) Prior Publication Data
US 2012/0221622 A1 Aug. 30, 2012

(51) Int. Cl.
*G06F 15/16* (2006.01)
(52) U.S. Cl.
USPC .............................. 709/202; 726/26; 719/321
(58) Field of Classification Search
USPC .............. 711/103; 713/165; 719/324; 726/26
See application file for complete search history.

(56) References Cited

U.S. PATENT DOCUMENTS

| 6,243,809 | B1 | 6/2001 | Gibbons et al. |
| 2005/0120242 | A1 | 6/2005 | Mayer et al. |
| 2005/0193118 | A1 | 9/2005 | Le et al. |
| 2005/0264400 | A1 | 12/2005 | Fisher |
| 2008/0320198 | A1 | 12/2008 | Desai et al. |
| 2009/0055603 | A1 | 2/2009 | Holt |
| 2009/0150550 | A1 | 6/2009 | Barreto et al. |
| 2009/0150909 | A1* | 6/2009 | Barreto et al. ............... 719/324 |
| 2009/0183254 | A1 | 7/2009 | Franco et al. |
| 2010/0030929 | A1 | 2/2010 | Ben-Yacov et al. |
| 2010/0115177 | A1* | 5/2010 | Bryant-Rich et al. ........ 711/103 |
| 2010/0175107 | A1 | 7/2010 | Sugarbroad |
| 2011/0145886 | A1 | 6/2011 | McKenzie et al. |
| 2012/0131336 | A1* | 5/2012 | Price et al. .................... 713/165 |

OTHER PUBLICATIONS

International Preliminary Report on Patentability and Written Opinion in International application No. PCT/US2011/055647, 8 pages, mailed Sep. 6, 2013.

* cited by examiner

*Primary Examiner* — Dustin Nguyen
(74) *Attorney, Agent, or Firm* — Baker Botts L.L.P.

(57) ABSTRACT

Systems and methods for unlocking a device remotely from a server, where the device is connected locally to a client, and the server is remote to the client and the device, are provided in accordance with various aspects of the subject technology. In one aspect, a system includes a remote unlocking module configured to monitor, at the server, traffic between a secure application and a virtual bus driver for at least one string descriptor request associated with switching an interface of the device from a first interface type to a second interface type, and to intercept the at least one string descriptor request. The system further includes an agent configured to receive the intercepted at least one string descriptor request, and to send the intercepted at least one string descriptor request from the server to the client over a network.

13 Claims, 17 Drawing Sheets

SYSTEM AND METHOD FOR UNLOCKING A DEVICE REMOTELY FROM A SERVER

FIELD

The subject technology relates to remote computing, and more particular to remotely unlocking a device.

BACKGROUND

One approach to the design and implementation of computer networks, particularly with regard to the development of client/server applications, includes designing client applications and client devices so that the majority of the heavily used resources are at a remote computing device, such as a centralized server, connected via network. These client devices generally have minimal memory, disk storage, and processor power, but are designed under the premise that most users connected to a powerful server do not need the additional processing power. With these client devices, the total cost of ownership is minimized, because of the reduced resources and because the clients can be centrally administered and updated from the server. As such, these client devices are suited for a network which can handle a significant number of devices.

SUMMARY

In one aspect, a system for unlocking a device remotely from a server, wherein the device is connected locally to a client, and the server is remote to the client and the device, is provided. The system may comprise a remote unlocking module configured to monitor, at the server, traffic between a secure application and a virtual bus driver for at least one string descriptor request associated with switching an interface of the device from a first interface type to a second interface type, and to intercept the at least one string descriptor request. The system may further comprise an agent configured to receive the intercepted at least one string descriptor request, and to send the intercepted at least one string descriptor request from the server to the client over a network.

In one aspect, a method for unlocking a device remotely from a server, wherein the device is connected locally to a client, and the server is remote to the client and the device, is provided. The method may comprise monitoring, at the server, traffic between a secure application and a virtual bus driver for at least one string descriptor request associated with switching an interface of the device from a first interface type to a second interface type. The method may further comprise intercepting the at least one string descriptor request between the secure application and the virtual bus driver, and sending the intercepted at least one string descriptor request from the server to the client over a network.

In one aspect, a machine-readable storage medium encoded with instructions executable by a processing system to perform a method for unlocking a device remotely from a server, wherein the device is connected locally to a client, and the server is remote to the client and the device, is provided. The instructions may comprise code for monitoring, at the server, traffic between a secure application and a virtual bus driver for at least one string descriptor request associated with switching an interface of the device from a first interface type to a second interface type. The instructions may further comprise code for intercepting the at least one string descriptor request between the secure application and the virtual bus driver, and sending the intercepted at least one string descriptor request from the server to the client over a network.

In one aspect, an apparatus for unlocking a device remotely from a server, wherein the device is connected locally to a client, and the server is remote to the client and the device, is provided. The apparatus may comprise means for monitoring, at the server, traffic between a secure application and a virtual bus driver for at least one string descriptor request associated with switching an interface of the device from a first interface type to a second interface type. The apparatus may further comprise means for intercepting the at least one string descriptor request between the secure application and the virtual bus driver, and means for sending the intercepted at least one string descriptor request from the server to the client over a network.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
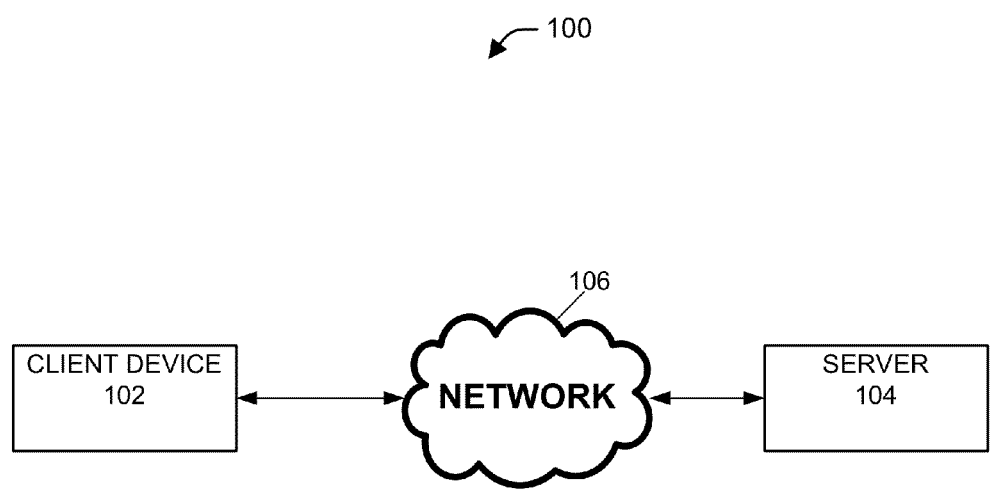
FIG. 1 is a conceptual block diagram of a computer network, in accordance with various aspects of the subject technology.

FIG. 1 illustrates a simplified diagram of a system 100 in accordance with an aspect of the present disclosure. The system 100 may include a client 102 in communication with a server 104 via a network 106. In one aspect, the server 104 is configured to support a remote session (e.g., a remote desktop session) wherein a user at the client 102 can remotely access applications and data at the server 104 from the client 102. Such a connection may be established using any of several well-known techniques such as the Remote Desktop Protocol (RDP) and the Citrix® Independent Computing Architecture (ICA).

In one aspect, the client 102 may represent a computer, a mobile phone (e.g., smart phone), a laptop computer, a thin client device, a personal digital assistant (PDA), a portable computing device, or a suitable device with a processor. In one aspect, a server 204 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor.

In one aspect, the client 102 may initiate a remote session with the server 104 by sending a request for remote access and credentials (e.g., login name and password) to the server 104. If the server 104 accepts the credentials from the client 102, then the server 104 may establish a remote session, which allows a user at the client 102 to access applications and data at the server 104. During the remote session, the server 104 sends display data to the client 102 over the network 106, which may include display data of a desktop and/or one or more applications running on the server 104. The desktop may include, for example, icons corresponding to different applications that can be launched on the server 104. The display data allows the client 102 to locally display the desktop and/or application running on the server 104.

During the remote session, the client 102 may send user commands (e.g., inputted via a mouse or keyboard at the client 102) to the server 104 over the network 106. The server 104 may process the user commands from the client 102 similar to user commands received from an input device that is local to the server 104. For example, if the user commands include mouse movements, then the server 104 may move a pointer on the desktop running on the server 104 accordingly. When the display data of the desktop and/or application changes in response to the user commands, the server 104 sends the updated display data to the client 102. The client 102 locally displays the updated display data so that the user at the client 102 can view changes at the server 104 in response to the user commands. Together, these aspects allow the user at the client 102 to locally view and input commands to the desktop and/or application that is running remotely on the server 104. From the perspective of the client side, the desktop running on the server 104 may represent a virtual desktop environment.

Figure 2:
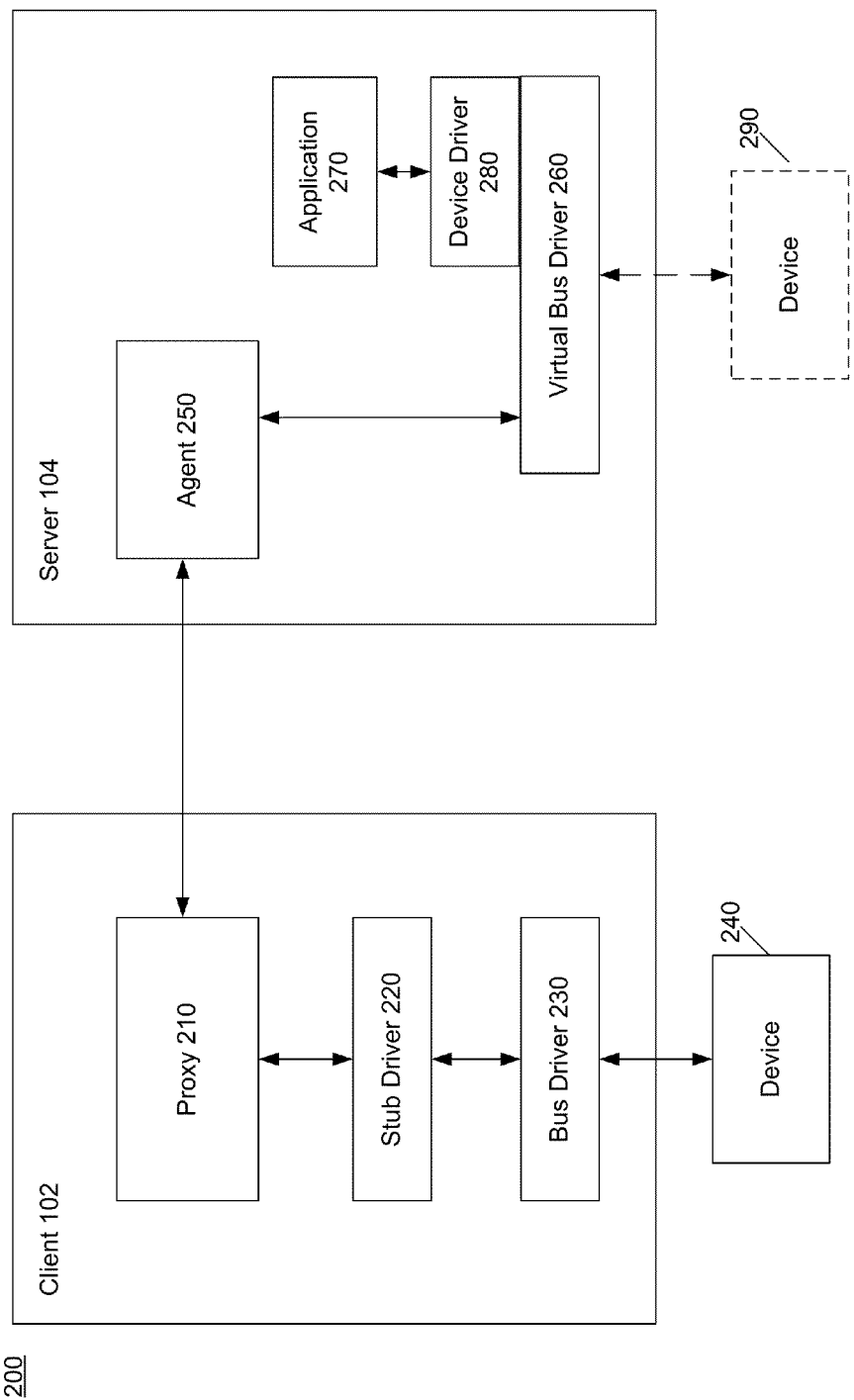
FIG. 2 is a conceptual block diagram of a local device virtualization system, in accordance with various aspects of the subject technology.

FIG. 2 is a block diagram of a local device virtualization system 200 according to an aspect of the disclosure. The system 200 may include the client 102 in communication with the server 104 over the network 106 (illustrated in FIG. 1). The client 102 may include a proxy 210, a stub driver 220, and a bus driver 230. The client 102 can be connected to a device 240, as shown in FIG. 2. The server 104 may include an agent 250, and a virtual bus driver 260.

According to the illustrated configuration, while the device 240 is not locally or physically connected to the server 104 and is remote to the server 104, the device 240 appears to the server 104 as if it is locally connected to the server 104, as discussed further below. Thus, the device 240 appears to the server 104 as a virtual device 290.

By way of illustration and not limitation, the device 240 may be a machine-readable storage medium (e.g., flash storage device), a printer, a scanner, a camera, a facsimile machine, a phone, an audio device, a video device, a peripheral device, or other suitable device that can be connected to the client 102. The device 240 may be an external device (i.e., external to the client 102) or an internal device (i.e., internal to the client 102).

In one aspect of the disclosure, the device 240 is a Universal Serial Bus (USB) device that can be locally connected to the client 102 using a wired USB or wireless USB connection and communicates with the client 102 according to a USB communications protocol. In another aspect, the device 240 may be a device other than a USB device.

As used herein, a "local" device of a system, or a device "locally" connected to a system, may be a device directly connected to the system using one or more wires or connectors (e.g., physically connected to the system), or a device directly connected to the system using a wireless link (e.g., Bluetooth). For example, device 240 is a local device of client 102. Furthermore, in one aspect of the disclosure, a local device of a system or a device locally connected to a system may include a device within the system (e.g., an internal device of client 102).

A "remote" device, or a device "remote" to a system, may be a device that is not directly connected to the system. For example, the server 104 is remote to both client 102 and device 240 because server 104 is not directly connected to client 102 or device 240 but connected indirectly through network 106 (illustrated in FIG. 1), which can include, for example, another server, or the Internet.

The bus driver 230 can be configured to allow the operating system and programs of the client 102 to interact with the device 240. In one aspect, when the device 240 is connected to the client 102 (e.g., plugged into a port of the client 102), the bus driver 230 may detect the presence of the device 240 and read information regarding the device 240 ("device information") from the device 240. The device information may include features, characteristics and other information specific to the device. For an example of a USB device, the device information may comprise a device descriptor (e.g., product ID, vender ID and/or other information), a configuration descriptor, an interface descriptor, an endpoint descriptor and/or a string descriptor. The bus driver 230 may communicate with the device 240 through a computer bus or other wired or wireless communications interface.

In one aspect, a program (e.g., application) running locally on the client 102 may access the device 240. For example, the device 240 may be accessed locally when the client 102 is not connected to the server 104. In this aspect, the operating system (e.g., Microsoft Windows®) of the client 102 may use the device information to find and load an appropriate device driver (not shown) for the device 240. The device driver may provide the program with a high-level interface to the device 240.

In one aspect, the device 240 may be accessed from the server 104 as if the device were connected locally to the server 240. For example, the device 240 may be accessible from the desktop running on the server 104 (i.e., virtual desktop environment). In this aspect, the bus driver 230 may be configured to load the stub driver 220 as the default driver for the device 240. The stub driver 220 may be configured to report the presence of the device 240 to the proxy 210 and to provide the device information (e.g., device descriptor) to the proxy 210.

The proxy 210 may be configured to report the presence of the device 240, along with the device information, to the agent 250 of the server 104 over the network 106 (illustrated in FIG. 1). Thus, the stub driver 220 redirects the device 240 to the server 104 via the proxy 210.

The agent 250 may be configured to receive the report from the proxy 210 that the device 240 is connected to the client 102 and the device information. The agent 250 can provide notification of the device 240, along with the device information, to the virtual bus driver 260. The virtual bus driver 260 may be configured to report to the operating system of the server 104 that the device 240 is connected and to provide the device information to the operating system. This allows the operating system of the server 104 to recognize the presence of the device 240 even though the device 240 is connected to the client 102. The operating system of the server 104 may use the device information to find and load an appropriate device driver 280 for the device 240 at the server 104, an example of which is illustrated in FIG. 2. As a result, the device 240 is enumerated on the server 104. Once the presence of the device 240 is reported to the operating system of the server 104, the device 240 may be accessible from the desktop running on the server 104 (i.e., virtual desktop environment). For example, the device 240 may appear as an icon on the virtual desktop environment and/or may be accessed by applications running on the server 104.

In one aspect, an application 270 running on the server 104 may access the device 240 by sending a transaction request for the device 240 to the virtual bus driver 260 either directly or through the device driver 280. The virtual bus driver 260 may direct the transaction request to the agent 250, which sends the transaction request to the proxy 210 over the network 106. The proxy 210 receives the transaction request from the agent 250, and directs the received transaction request to the stub driver 220. The stub driver 220 then directs the transaction request to the device 240 through the bus driver 230.

The bus driver 230 receives the result of the transaction request from the device 240 and sends the result of the transaction request to the stub driver 220. The stub driver 220 directs the result of the transaction request to the proxy 210, which sends the result of the transaction request to the agent 250 over the network 106. The agent 250 directs the result of the transaction request to the virtual bus driver 260. The virtual bus driver 260 then directs the result of the transaction request to the application 270 either directly or through the device driver 280.

Thus, the virtual bus driver 260 may receive transaction requests for the device 240 from the application 270 and send results of the transaction requests back to the application 270 (either directly or through the device driver 280). As such, the application 270 may interact with the virtual bus driver 260 in the same way as a bus driver for a device that is connected locally to the server 104. The virtual bus driver 260 may hide the fact that it sends transaction requests to the agent 250 and receives the results of the transaction requests from the agent 250 instead of a device that is connected locally to the server 104. As a result, the device 240 connected to the client 102 may appear to the application 270 as if the physical device 240 is connected locally to the server 104.

Figure 3:
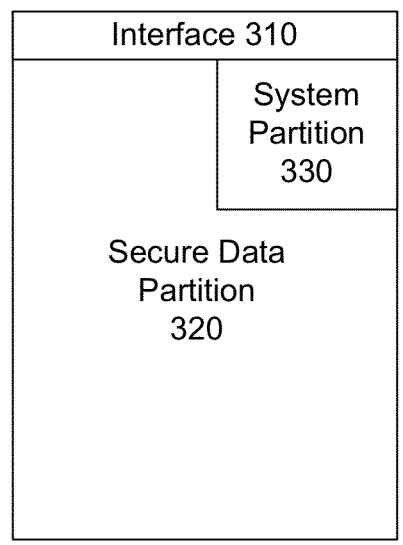
FIG. 3 is a conceptual block diagram of a lockable device, in accordance with various aspects of the subject technology.

Referring to FIG. 3, in one aspect of the present disclosure, the device 240 may be a storage device comprising an interface 310 and memory that is partitioned into a secure data partition 320 and a system partition 330. The interface 310 may be implemented in hardware, software or a combination of both. The interface 310 may restrict access to the secure data partition 320 by initially locking the secure data partition 320 when the device 240 is connected to the client 102 until an unlocking procedure is completed. In one aspect, the system partition 330 may comprise a secure application for unlocking the secure data partition 320. The secure application may be read from the system partition 330 and executed to unlock the secure data partition 320, as discussed further below. In one aspect, interface 310 may be configured to unlock the secure data partition 320 when the interface 310 receives a sequence of instructions from the secure application. For example, the device 240 may be a U3 storage device that is partitioned into a secure data partition for securely storing data and a system partition comprising a secure application (e.g., LaunchPad®) for unlocking the secure data partition 320.

The interface 310 may also comprise device information (e.g., device descriptor) that may be read to identify the device 240. In one aspect, when an operating system reads the device information, the operating system may interpret the device 240 as a composite device comprising two sub-devices, where one of the sub-devices corresponds to the system partition 320 and the other corresponds to the secure data partition 330. Thus, the device 240 may be identified as two sub-devices in a desktop environment. For the example of a U3 storage device, the two sub-devices may comprise a CD drive corresponding to the system partition 330 and a removable disk corresponding to the secure data partition 330. In this example, the first sub-device may emulate a CD drive so that the operating system automatically launches the secure application when the device 240 is connected. This takes advantages of the fact that some operating systems (e.g., Microsoft Window®) may be configured to automatically load an executable application in a CD drive.

In one aspect, the interface 310 may support different types of interfaces for unlocking the secure data partition 320. For example, the interface 310 may support a Small Computer System Interface (SCSI) and a Human Interface Device (HID) for unlocking the secure data partition 320. For example, the interface 310 may be initially set to provide a SCSI only device interface, which only allows an administrator to unlock the secure data partition 320. In this example, the interface 310 may be initially set to the SCSI only device interface when the device 240 is connected to the client 120. The interface 310 may be configured to switch from the SCSI only device interface to a SCSI and HID composite device interface for unlocking the secure data partition 320 when the device 240 receives one or more instructions from the secure application, wherein the HID interface allows a non-administrator user to unlock the secure data partition 320. After the switch, the interface 310 may still require an unlocking commands (e.g., HID commands) from the secure application 270, which may include user credentials (e.g., password), to unlock the secure data partition 320. Thus, the unlocking process may comprise two stages: switching the interface type for unlocking the secure data partition 320 (e.g., from SCSI only device interface to SCSI and HID composite device interface) and sending unlocking commands to the device 240 after the switch.

Figure 4:
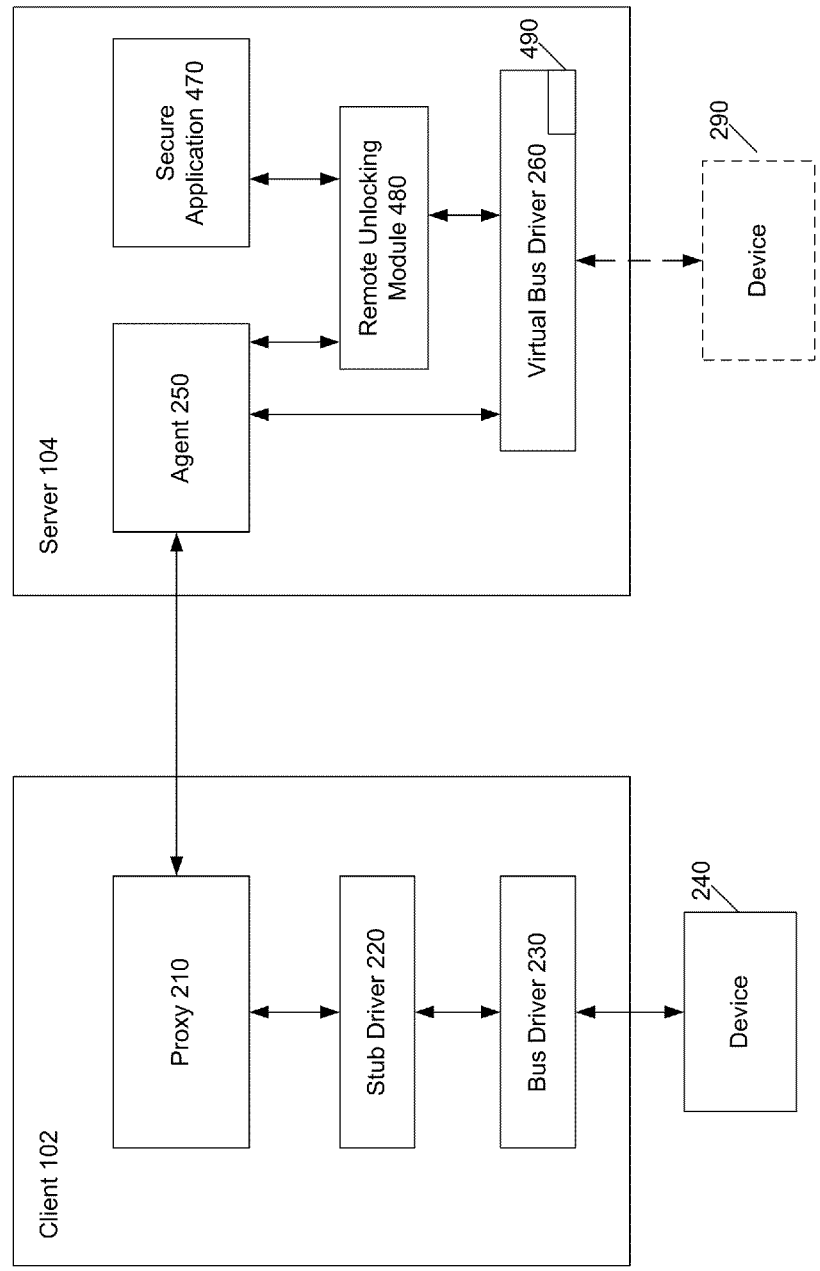
FIG. 4 is a conceptual block diagram of a system for unlocking a device, in accordance with various aspects of the subject technology.

In one aspect, the device 240 may be unlocked from the server 104 (e.g., virtual desktop environment) when the device 240 is connected to the client 102. Referring to FIG. 4, the server 104 may comprise a secure application 470 and a remote unlocking module 480 according to one aspect. In one aspect, the secure application 470 may be uploaded to the server 104 from the client 102 when the device 240 is connected to the client 102. In another aspect, the secure application 470 may already reside on the server 104.

In one aspect, when the device 240 is connected to the client 102, the bus driver 230 may read the device information from the interface 310 and direct the device information to the stub driver 220. The stub driver 220 may then direct the device information to the proxy 210, which sends the device information to the agent 250 of the server 104 over the network 106. The agent 250 then directs the device information to the virtual bus driver 260. In one aspect, the virtual bus driver 260 may store the device information in a cache 490. The virtual bus driver 260 may then report the presence of the device 240 to the operating system of the server 104. In one aspect, the operating system may receive the device information from the virtual bus driver 260 to identify the device 240.

Figure 5A:
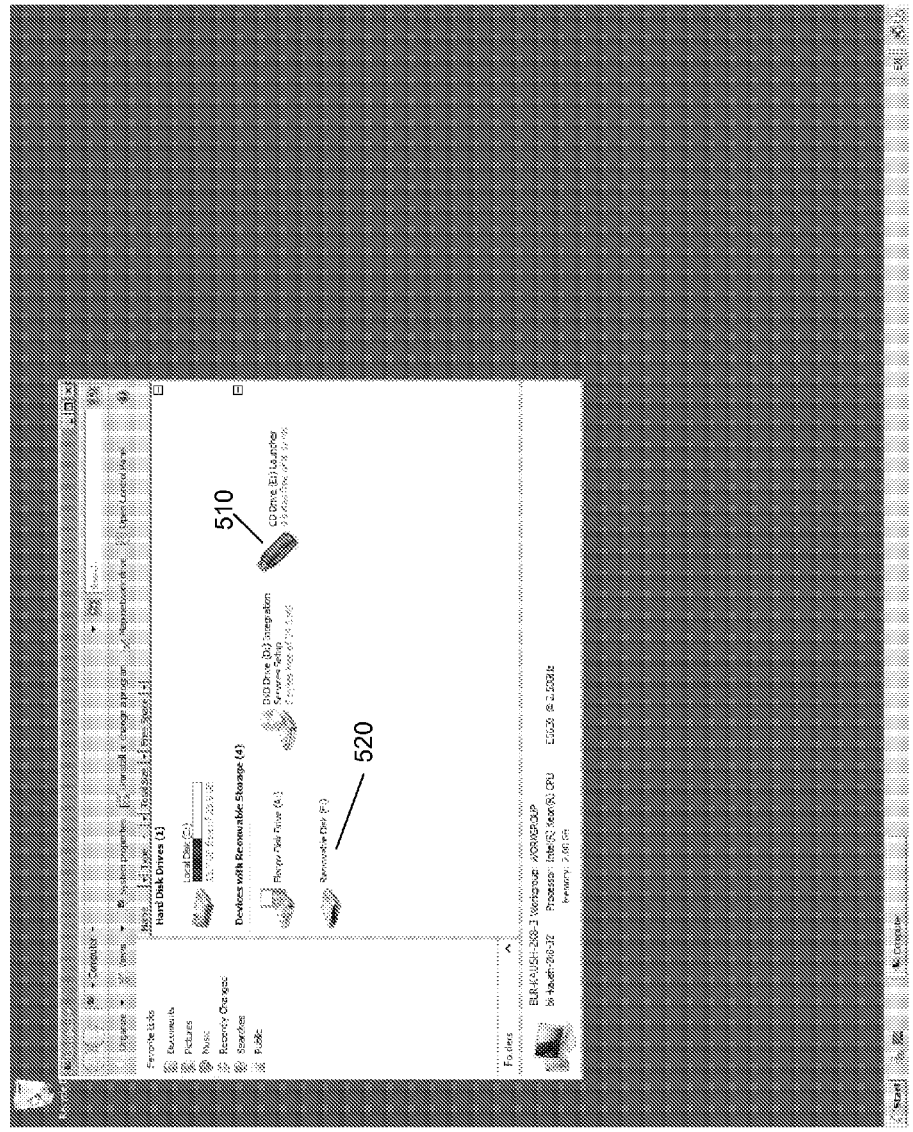
FIGS. 5A-5E illustrate exemplary displays of a virtual desktop environment during an unlocking process, in accordance with various aspects of the subject technology.
Figure 5B:
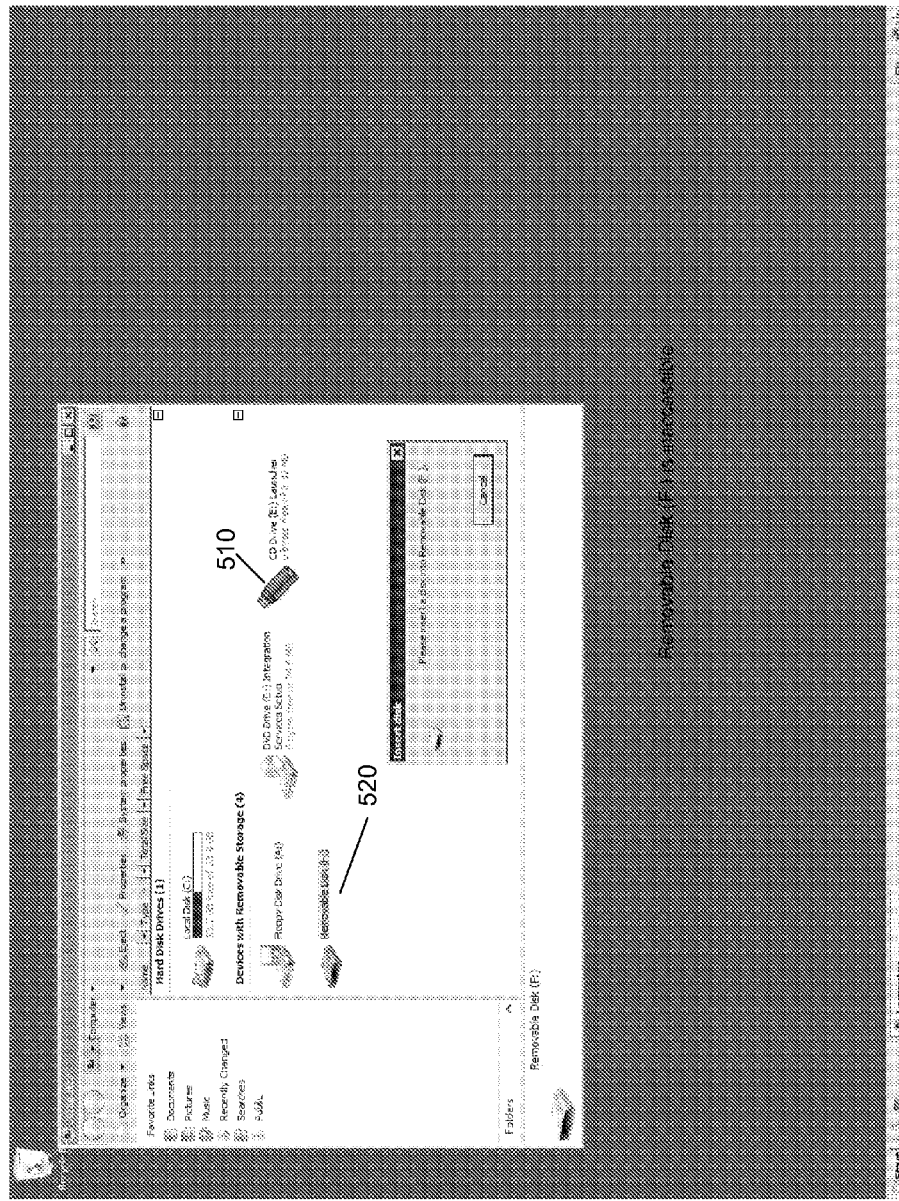

In one aspect, the operating system may identify that the device 240 is a composite device based on the device information (e.g., device descriptor) and interpret the device as two sub-devices, where one of the sub-devices corresponds to the system partition 330 and the other corresponds to the secure data partition 320. For example, FIG. 5A shows an exemplary display of the virtual desktop environment, in which the device 240 appears as a CD drive 510 and a removable disk 520 in the virtual desktop environment (i.e., desktop running on the server 104). In the example in FIG. 5B, the operating system prompts the user to insert a disk into the removable disk, indicating that the secure data partition 320 is inaccessible at this time. The server 104 sends the display data for the desktop to the client 102 so that the user at the client 102 can view the virtual desktop environment locally at the client 102.

In one aspect, the operating system of the server 104 may launch the secure application automatically or in response to a command (e.g., double click) from the user at the client 102. In one aspect, the operating system may send a corresponding transaction request for the secure application to the virtual bus driver 260. From the virtual bus driver 260, the transaction request may be sent to the device 240 through the agent 250, the proxy 210, the stub driver 220 and the bus driver 230. In response to the transaction request, the bus driver 230 may receive the secure application from the device 240. From the bus driver 230, the secure application may be sent to the virtual bus driver 260 through the stub driver 220, the proxy 210 and the agent 250. From the virtual bus driver 260, the operating system of the server 104 may launch the secure application 470 at the server 104.

Once launched, the secure application 470 may perform a sequence of steps to unlock the secure data partition 320 of the device 240. In one aspect, the secure application 470 may need to switch the device to a SCSI and HID composite device interface from the default SCSI only device interface to unlock the secure data partition 320 if the user is a non-administrator user. To perform this switching operation, the secure application 470 may send a sequence of string descriptor requests for switching the interface of the device 240. In one aspect, these requests are sent to the virtual bus driver 260. For an example of a U3 storage device, the sequence of string descriptor requests may be indexed, wherein the string descriptor requests for index 4, 5 and 6 are associated with switching the interface of the device 240. In this example, the string descriptor requests for index 4, 5 and 6 may be referred to as U3 requests.

In one aspect, the remote unlocking module 480 may monitor traffic from the secure application 470 to the virtual bus driver 260 for string descriptor requests (e.g., string descriptor requests for index 4, 5 and 6) associated with switching the interface of the device 240. The remote unlocking module 480 may then intercept these string descriptor requests and send them to the agent 250, which sends these string descriptor requests over the network 106 to the proxy 210 on the client side. From the proxy 210, the string descriptor requests may be sent to the device 240 through the stub driver 220 and the bus driver 230.

In response to the string descriptor requests (e.g., string descriptor requests for index 4, 5 and 6), the interface 310 of the device 240 may be configured to switch from the SCSI only device interface to the SCSI and HID composite device interface. For an example of a U3 storage device, the device 240 may send a confirmation that the device 240 is a U3 storage device in response to one of the string descriptor requests (e.g., string descriptor request for index 4), as discussed further below. After the switch, the secure data partition 320 may be unlocked upon entry of a valid password, as discussed further below.

In one aspect, the remote unlocking module 480 may be configured to allow other string descriptor requests that are not associated with switching the interface of the device 240 to pass to the virtual bus driver 260, which handles the other string descriptor requests. In this aspect, the virtual bus driver 260 may be configured to respond to string descriptor requests by retrieving the requested information from the device information stored in the cache 490 without forwarding the string descriptor request to the device 240 and sending the requested information to the application 470. For example, the string descriptor requests (e.g., string descriptor requests for index 1, 2 and/or 3) may request the product ID, vendor ID and/or version of the device 240. In this aspect, the remote unlocking module 480 may intercept string descriptor requests (e.g., string descriptor requests for index 4, 5 and 6) associated with switching the interface of the device 240 and send them to the agent 250 to ensure that these requests are sent to and processed by the device 240, and not queried from the cache 490 of the virtual bus driver 260.

After the device 240 is switched to the SCSI and HID composite device interface, the device 240 may send new device information for the device 240 to the bus driver 230, wherein the new device information reflects the change in the interface 310. From the bus driver 230, the new device information may be sent to the virtual bus driver 260 through the stub driver 220, the proxy 210 and the agent 250. The virtual bus driver 260 may report the new device information to the operating system of the server 104.

Figure 5C:
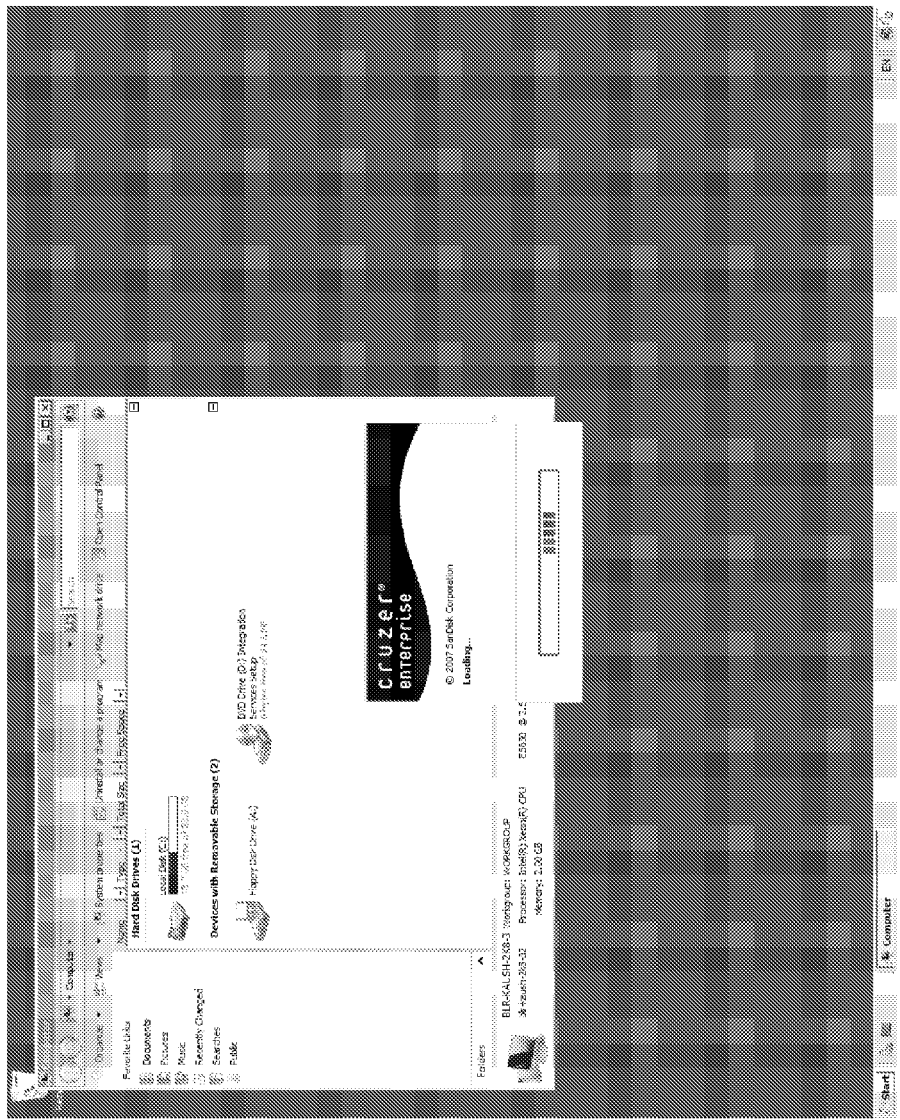
Figure 5D:
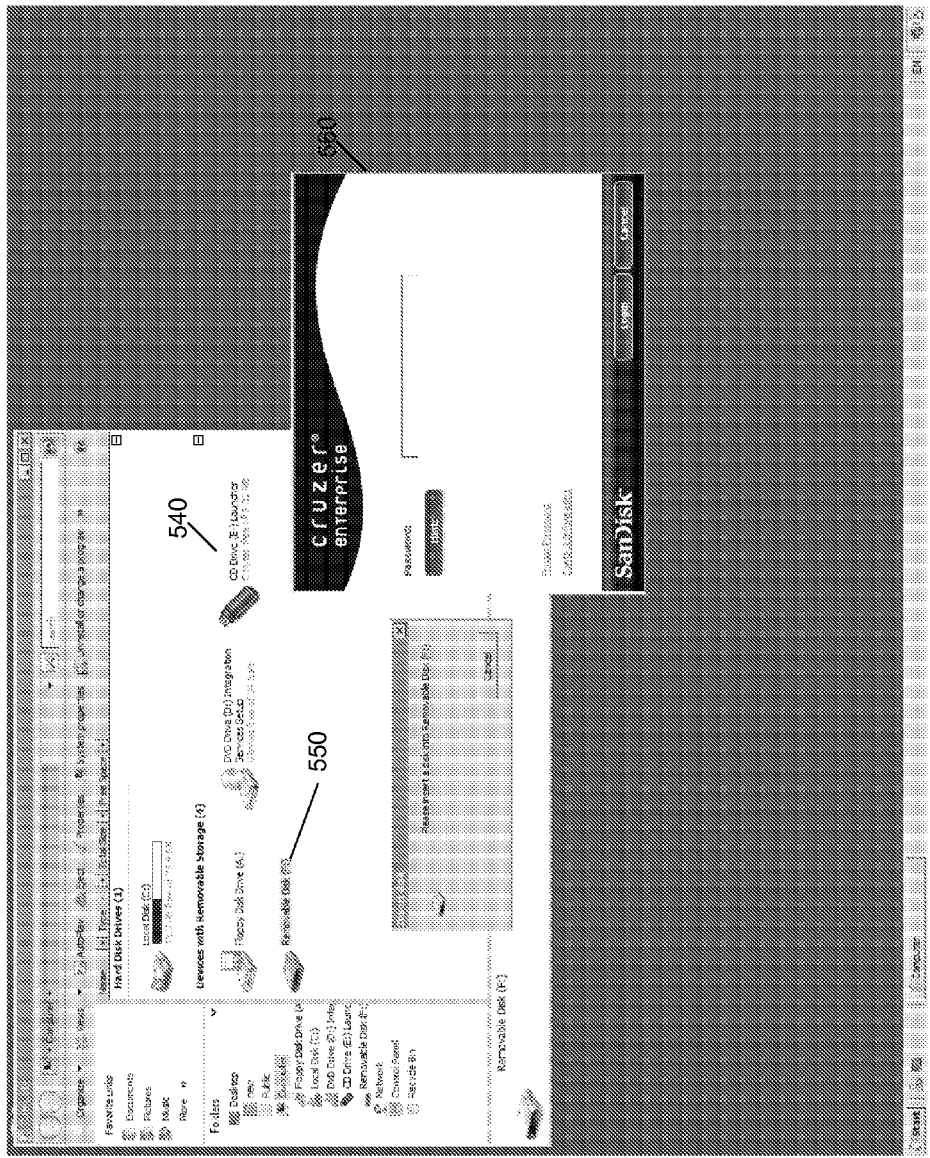

In response, the operating system may remove, from the virtual desktop environment, the sub-devices for the device 240 based on the old device information. This process may be referred to as a virtual plug out because the sub-devices for the device 240 are removed from the virtual desktop environment even though the device 240 remains physically connected to the client 102. FIG. 5C shows an exemplary virtual desktop environment, in which the sub-devices 510 and 520 (e.g., CD-drive and removable disk) shown in FIG. 5B have been virtually plugged out. The operating system may then add, to the virtual desktop environment, new sub-drives for the device 240 based on the new device information. This process may be referred to as a virtual plug in because the new sub-devices for the device 240 are added to the virtual desktop environment even though a new device is not physically connected to the client 102. FIG. 5D shows an exemplary virtual desktop environment, in which the sub-devices are virtually plugged in. In this example, the sub-devices comprise a CD-drive 540 corresponding to the system partition 330 and a removable disk 550 corresponding to the secure data partition 320. Also, in this example, the removable disk 550 is not accessible until a valid password is sent to the device 240. This is indicated by the prompt in the virtual desktop environment for the user to insert a disk into the removable disk.

At this time, the secure application 470 may recognize from the new device information that the interface 310 has been switched to the SCSI and HID composite device interface, which allows a non-administrator user to unlock the secure data partition 320, e.g., with an HID command. The secure application 470 may then display a prompt 560 on the virtual desktop environment for the user to enter a password, as shown in the example in FIG. 5D. The server 104 sends display data with the prompt 560 to the client 102 so that the user at the client 102 can view the prompt 560 locally at the client 102. The user at the client 102 may then enter the valid password using an input device (e.g., keyboard) at the client 102. The client 102 may then forward the password to the server 104. Upon receiving the password, the secure application 470 may generate and send an unlocking command (e.g., HID command) to the virtual bus driver 260. The command may include the password and/or other user credentials. From the virtual bus driver 260, the command may be sent to the device 240 through the agent 250, the proxy 210, the stub driver 220 and the bus driver 230.

Figure 5E:
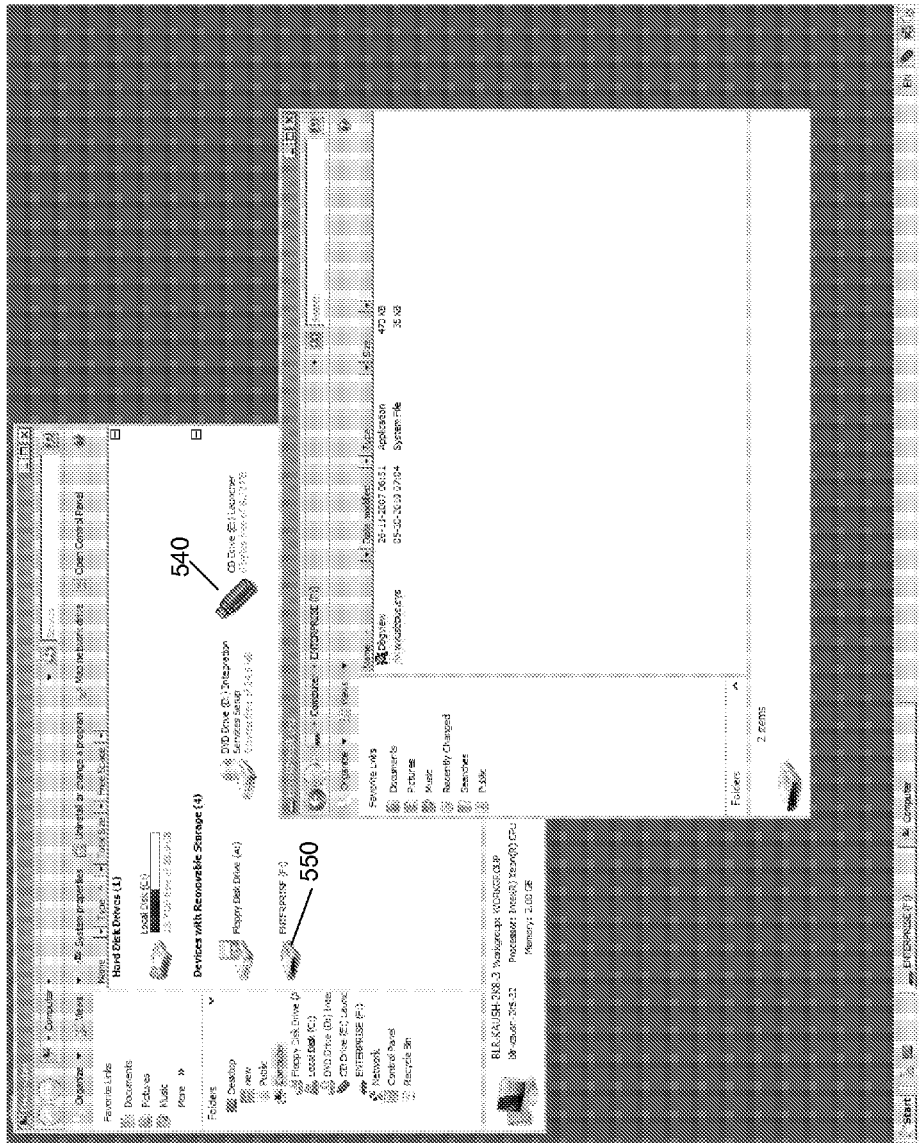

In response to the command, the interface 310 may unlock the secure data partition 320 if the password in the command is valid. In this case, the device 240 may send a name (e.g., "Enterprise") associated with the secure data partition 320, which is stored in the secure data partition 320, to the bus driver 230. From the bus driver 230, the name may be sent to the virtual bus driver 260 through the stub driver 220, the proxy 210 and the agent 250. The virtual bus driver 260 may then report the name to the operating system of server 104, which identifies the sub-device (e.g., removable disk) corresponding to the secure data partition 320 by the received name. An example of this is illustrated in FIG. 5E, in which the removable disk 550 is identified by the name "Enterprise." At this point, the secure data partition 320 is unlocked and now accessible to the user. The user may then access/modify/create data in the secure data partition 320 of the device 240.

Figure 6:
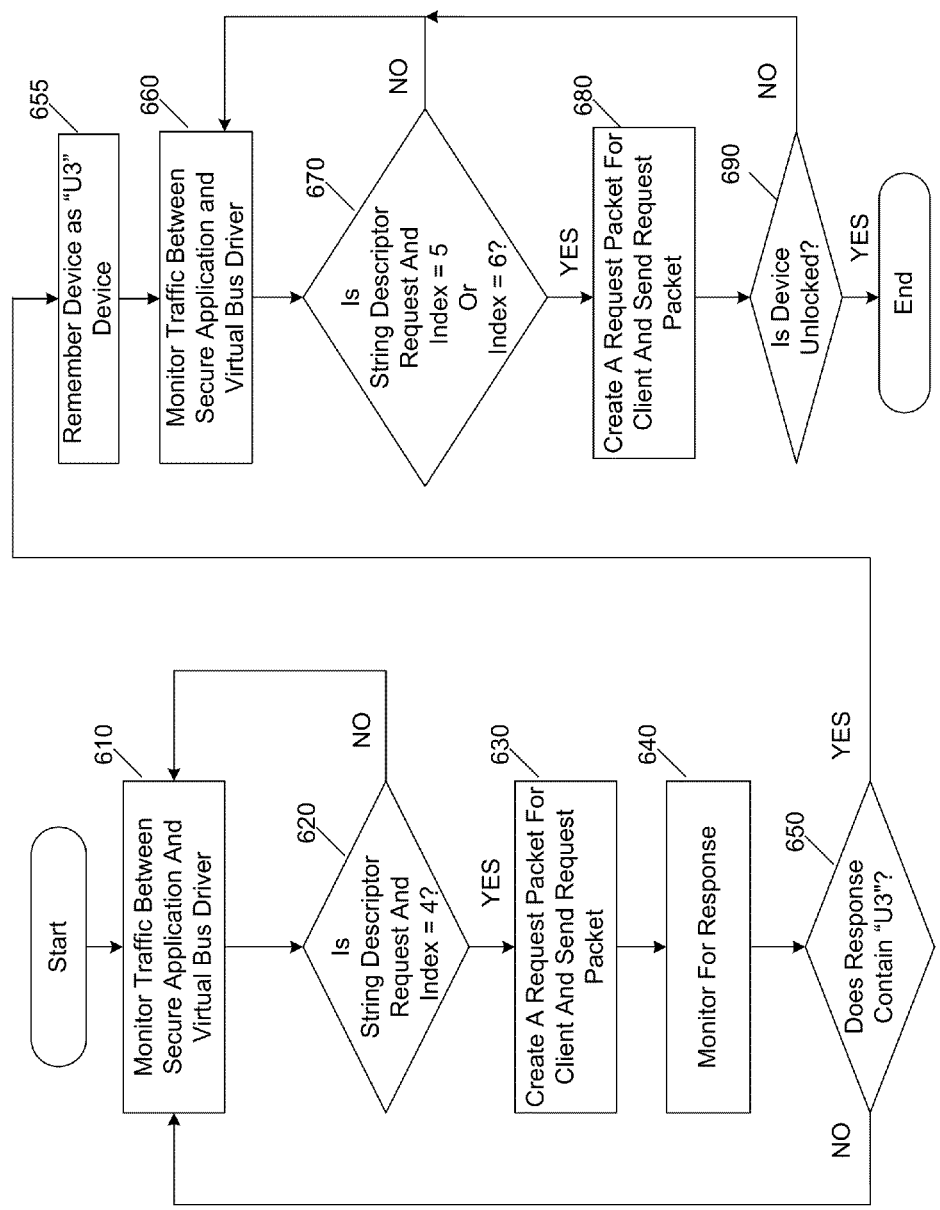
FIG. 6 is a flowchart illustrating an exemplary method for unlocking a device, in accordance with various aspects of the subject technology.

FIG. 6 is a flowchart illustrating an exemplary method of unlocking a device according to an aspect of the disclosure. The method may be performed by the remote unlocking module 480 to unlock a U3 storage device. In one aspect, the method may begin after the secure application 470 has been launched on the server 104.

In step 610, traffic between the secure application 470 and the virtual bus driver 260 is monitored. In step 620, the monitored traffic is checked for a string descriptor request for index 4. If there is no string descriptor request for index 4, then the method returns to step 610. If there is a string descriptor request for index 4, then the method advances to step 630, where a request packet containing the string descriptor request for index 4 is created and sent to the client 102 over the network 106.

In step 640, the method may monitor for a response from the device 240. In step 650, a determination is made whether the response contains a specific pre-defined string confirming that the device 240 is a specific type of device (e.g., "U3" string confirming that the device 240 is a U3 storage device). If the response does not contain the pre-defined string (e.g., "U3" string), then the method returns to step 610. If the response contains the pre-defined string (e.g., "U3" string), then method advances to step 655, where the device 240 is remembered as the specific type of device corresponding to the pre-defined string (e.g., U3 storage device). From step 655, the method proceeds with an unlocking procedure for the specific type of device (e.g., U3 storage device).

In step 660, the traffic between the secure application 470 and the virtual bus driver 260 continues to be monitored. In step 670, the monitored traffic is checked to determine whether there is a string descriptor request for index 5 or index 6. If there is no string descriptor request for index 5 or index 6, then the method returns to step 660. If there is a string descriptor request for index 5 or index 6, then the method advances to step 680, where a request packet containing the string descriptor request is created and sent to the client over the network 106. In step 690, a determination is made whether the device 240 has been unlocked. If the device 240 has not been unlocked, then the method returns to step 660. If the device 240 has been unlocked, then the method ends.

In one aspect, the remote unlocking module 480 may be configured implement a protocol independent method to unlock a U3 storage device connected to the client 102 from the virtual desktop. To do this, the remote unlocking module 480 may monitor traffic between the secure application 480 and the virtual bus driver 260. This allows the remote unlocking module 480 to capture U3 requests (e.g., string descriptor requests for index 4, 5 and 6) from the secure application 480.

While monitoring the traffic, the remote unlocking module 480 may intercept string descriptor requests from the secure application 480, and check each intercepted string descriptor request to determine if the string descriptor request is for index 4.

If the intercepted string descriptor request is for index 4, then a request packet may be created to transport the request to the client 102 over the network 106. This ensures that the string descriptor request for index 4 is read by the physical device 240 connected to the client 102. The request packet may be created by the remote locking module 480 and/or the agent 250. The request packet may be in accordance with a communication protocol used to transport information over the network 106.

The remote unlocking module 480 may then check for a response to the request and determine whether the response contains a pre-defined string (e.g., "U3" string). If the response contains the pre-defined string ("U3" string), then the remote unlocking module 480 may remember the device as a specific type of device corresponding to the pre-defined string (e.g., U3 storage device), and perform the subsequent steps necessary to complete the unlocking procedure for the specific type of device (e.g., U3 storage device) on the client side.

The remote unlocking module 480 may continue to monitor traffic between the secure application 480 and the virtual bus driver 260 and intercept string descriptor requests for index 5 and 6. For each of these string descriptor requests, a request packet may be created to transport the request to the client over the network 106. This ensures that these string descriptor requests are read by the physical device 240 connected to the client 120. In response to these string descriptor requests, the device 240 may switch the interface 310 from a SCSI only device interface to a SCSI and HID composite device interface, as discussed above. After the switch, the secure data application partition 320 may be unlocked upon entry of a valid password via the secure application 480. After the device 240 is unlocked, the user will be able to access/modify/create data in the secure data portion 320 of the device 240.

Although the interface 310 switches from a SCSI only device interface to a SCSI and HID composite device interface in the above examples, it is to be appreciated that the interface 310 is not limited to these types of device interfaces, and other types of interfaces may be used. For example, the interface 310 is not limited to being initially set to the SCSI only device interface, and may be initially set to any type of interface that only allows an administrator user to unlock the device 240. As another example, the interface 310 is not limited to switching to the SCSI and HID composite device interface and may switch to any type of interface that allows a non-administrator user to unlock the device 240.

Figure 7:
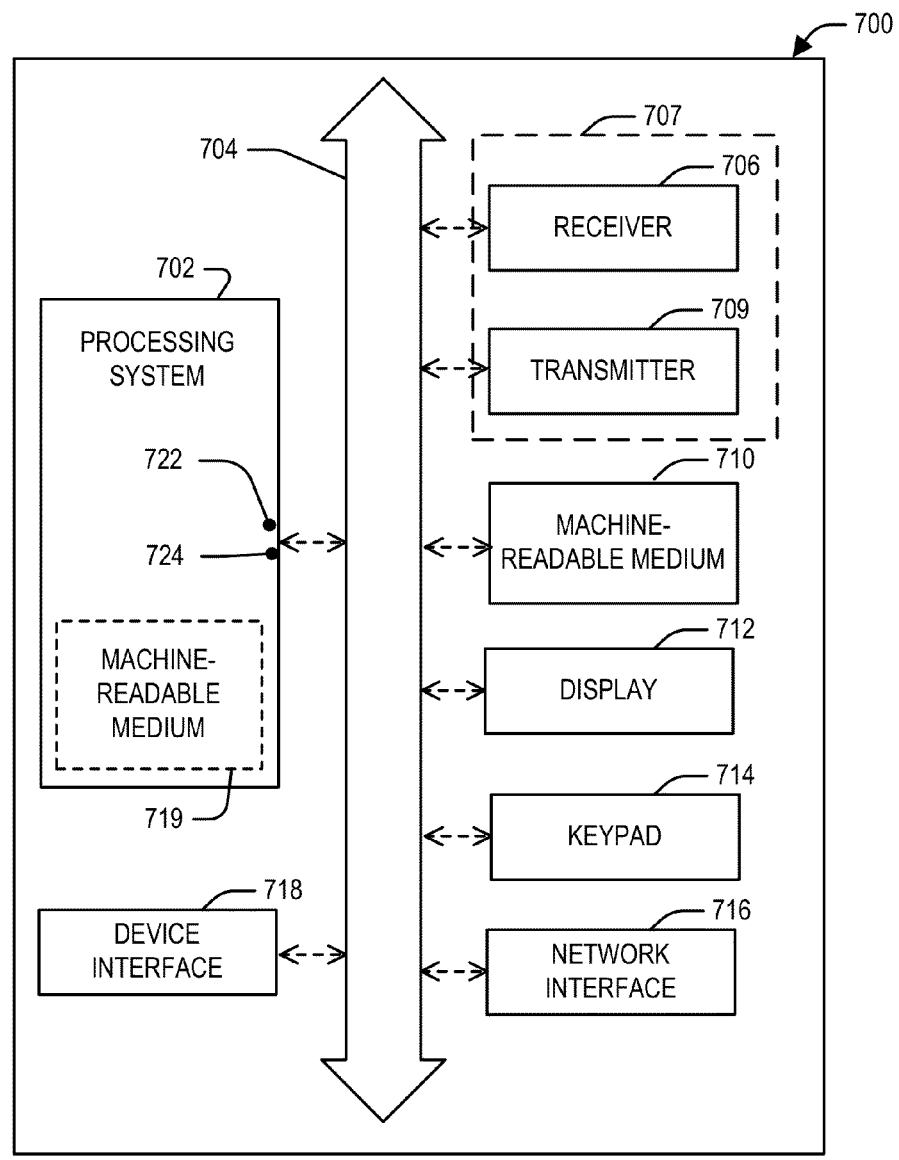
FIG. 7 is a conceptual block diagram of a system, in accordance with various aspects of the subject technology.

FIG. 7 is a conceptual block diagram illustrating an example of a system 700. The system 700 may be, for example, a client 102 or a server 104.

The system 700 includes a processing system 702. The processing system 702 is capable of communication with a receiver 706 and a transmitter 709 through a bus 704 or other structures or devices. It should be understood that communication means other than busses can be utilized with the disclosed configurations. The processing system 702 can generate audio, video, multimedia, and/or other types of data to be provided to the transmitter 709 for communication. In addition, audio, video, multimedia, and/or other types of data can be received at the receiver 706, and processed by the processing system 702.

The processing system 702 may include a general-purpose processor or a specific-purpose processor for executing instructions and may further include a machine-readable medium 719, such as a volatile or non-volatile memory, for storing data and/or instructions for software programs. The instructions, which may be stored in a machine-readable medium 710 and/or 719, may be executed by the processing system 702 to control and manage access to the various networks, as well as provide other communication and processing functions. The instructions may also include instructions executed by the processing system 702 for various user interface devices, such as a display 712 and a keypad 714. For the example of a client 102, the display 712 may be used to locally display the virtual desktop environment at the client 102, and the keypad 714 may be used to receive user input command, which may be forwarded to the server 104 over the network 106. The processing system 702 may include an input port 722 and an output port 724. Each of the input port 722 and the output port 724 may include one or more ports. The input port 722 and the output port 724 may be the same port (e.g., a bi-directional port) or may be different ports.

The processing system 702 may be implemented using software, hardware, or a combination of both. By way of example, the processing system 702 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 719) may include storage integrated into a processing system, such as might be the case with an ASIC. Machine-readable media (e.g., 710) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 702. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a client device or server or by a processing system of a client device or server. Instructions can be, for example, a computer program including code.

A network interface 716 may be any type of interface to a network (e.g., an Internet network interface) and may reside between any of the components shown in FIG. 7. For the example of a client 102, the network interface 716 may be used to send user commands and responses from the device 240 to the server 104 over the network 106, and to receive display data (e.g., display data for the virtual desktop) and instructions (e.g., string descriptor requests) from the server 104 over the network 106.

A device interface 718 may be any type of interface to a device and may reside between any of the components shown in FIG. 7. A device interface 718 may, for example, be an interface to an external device (e.g., USB device) that plugs into a port (e.g., USB port) of the system 700. For the example of a client 102, the bus driver 230 may be configured to detect the presence of a device 240 connected to the client 102 via the device interface 718, and to read device information (e.g., device descriptor) from the device 240 via the device interface 718 to identify the device 240.

A transceiver block 707 may represent one or more transceivers, and each transceiver may include a receiver 706 and a transmitter 709. A functionality implemented in a processing system 1202 may be implemented in a portion of a receiver 706, a portion of a transmitter 709, a portion of a machine-readable medium 710, a portion of a display 712, a portion of a keypad 1214, or a portion of an interface 716, and vice versa.

For the example of a client 102, the bus driver 230 may be implemented by the processing system 702, the device interface 718, the machine-readable medium 710 or any combination thereof and the proxy 210 may be implemented by the processing system 702, the network interface 716, the machine-readable medium 710 or any combination thereof. The stub driver 220 may be implemented by the processing system 702, the machine-readable medium 710 or any combination thereof. For example, the machine-readable medium 710 may comprise software programs that may be executed by the processing system 702 to realize various functions of the bus driver 230, stub driver 220 and the proxy 210.

For the example of a server 104, the virtual bus driver 260, device driver 280, and application may be implemented by the processing system 702, the machine-readable medium 710 or any combination thereof, and the agent 250 may be implemented by the network interface 716, the processing system 702, the machine-readable medium 710 or any combination thereof.

Illustration of System/Method/Machine-Readable Storage Medium/Apparatus for unlocking a device remotely from a server, wherein the device is connected locally to a client, and the server is remote to the client and the device (described as clauses)

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clause 1, 13, 25 and 37. The other clauses can be presented in a similar manner.

1. A system for unlocking a device (e.g., device 240 of FIG. 4) remotely from a server (e.g., server 104 of FIG. 4), wherein the device is connected locally to a client (e.g., client 102 of FIG. 4), and the server is remote to the client and the device, comprising:

a virtual bus driver (e.g., virtual bus drive 260 of FIG. 4);

a remote unlocking module (e.g., remote unlocking module 480 of FIG. 4) configured to monitor, at the server, a sequence of string descriptor requests from a secure application (e.g., secure application 470 of FIG. 4), to intercept at least one of the string descriptor requests in the sequence associated with switching an interface of the device from a first interface type to a second interface type, and to allow at least another one of the string descriptor requests in the sequence to be handled by the virtual bus driver; and an agent (e.g., agent 250 of FIG. 4) configured to receive the intercepted at least one of the string descriptor requests, and to send the intercepted at least one of the string descriptor requests from the server to the client over a network, wherein the virtual bus driver is configured to retrieve a portion of device information stored at the server in response to the at least another one of the string descriptor requests, and to send the retrieved portion of the device information to the secure application.

2. The system of clause 1, wherein the first interface type comprises only a Small Computer System Interface (SCSI) and the second interface type comprises the SCSI and a Human Interface Device (HID) interface.

3. The system of clause 1, wherein the first interface type only allows an administrator user to unlock the device and prevents unlocking of the device by a non-administrator user.

4. The system of clause 3, wherein the second interface type allows the non-administrator user to unlock the device.

5. The system of clause 1, wherein the device comprises a Universal Serial Bus (USB) device, and the at least one of the string descriptor requests associated with switching the interface of the device comprises string descriptor requests for index 4, 5 and 6, wherein the index 4, 5 and 6 are distinct from each other and sequential.

6. The system of clause 5, wherein the remote unlocking module is configured to monitor for a response from the device in response to the string descriptor request for index 4, and to determine whether the response from the device comprises a pre-defined string confirming that the device is a specific type of device.

7. The system of clause 6, wherein the specific type of device is a U3 storage device.

8. The system of clause 6, wherein, if the remote unlocking module determines that the response from the device comprises the pre-defined string, then the remote unlocking module is configured to monitor for the string descriptor requests for index 5 and 6, and to intercept the string descriptor requests for index 5 and 6.

9. The system of clause 1, wherein, after the interface of the device is switched to the second interface type, the virtual bus driver is configured to receive an unlocking command for the device from the secure application, and to provide the unlocking command to the agent, and wherein the agent is configured to send the unlocking command from the server to the client over the network.

10. The system of clause 1, wherein the at least another one of the string descriptor requests handled by the virtual bus driver comprises string descriptor requests for index 1, 2 and 3, wherein the index 1, 2 and 3 are distinct from each other and sequential.

11. The system of clause 1, wherein the portion of the device information comprises at least one of a product identification (ID) and a vendor identification (ID) for the device.

12. The system of clause 1, wherein the at least another one of the string descriptor requests handled by the virtual bus driver is prevented from being sent to the client.

Figure 8A:
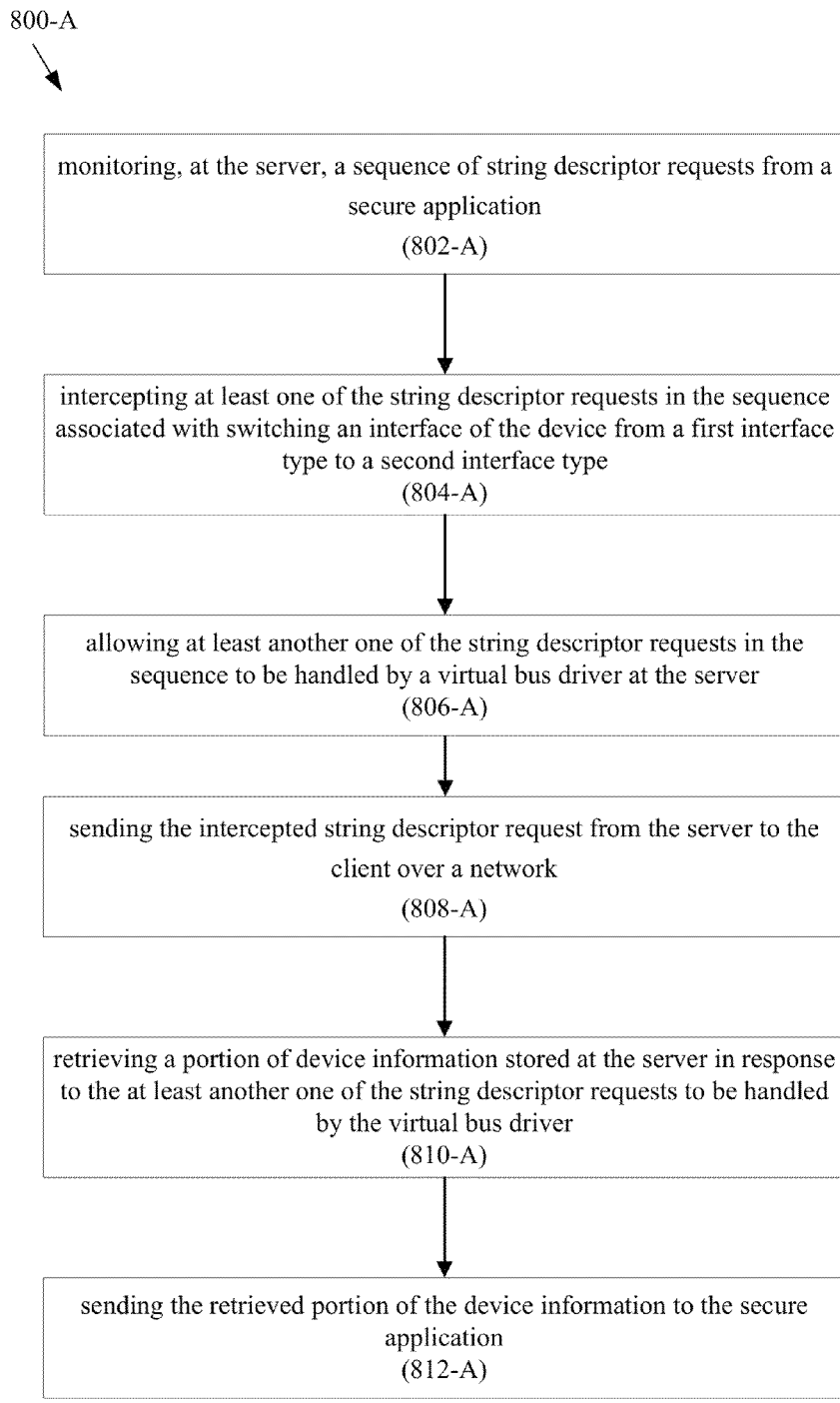
FIG. 8A is a block diagram representing an example of a method for unlocking a device remotely from a server, wherein the device is connected locally to a client, and the server is remote to the client and the device, in accordance with various aspects of the subject technology.

13. A method (see, e.g., method 800-A of FIG. 8A) for unlocking a device (e.g., device 240 of FIG. 4) remotely from a server (e.g., server 104 of FIG. 4), wherein the device is connected locally to a client (e.g., client 102 of FIG. 4), and the server is remote to the client and the device, comprising:

monitoring, at the server, a sequence of string descriptor requests from a secure application (e.g., secure application 470 of FIG. 4) (see, e.g., item 802-A of FIG. 8A);

intercepting at least one of the string descriptor requests in the sequence associated with switching an interface of the device from a first interface type to a second interface type (see, e.g., item 804-A of FIG. 8A);

allowing at least another one of the string descriptor requests in the sequence to be handled by a virtual bus driver (e.g., virtual bus driver 260 of FIG. 4) at the server (see, e.g., item 806-A of FIG. 8A);

sending the intercepted string descriptor request from the server to the client over a network (see, e.g., item 808-A of FIG. 8A);

retrieving a portion of device information stored at the server in response to the at least another one of the string descriptor requests to be handled by the virtual bus driver (see, e.g., item 810-A of FIG. 8A); and sending the retrieved portion of the device information to the secure application (see, e.g., item 812-A of FIG. 8A).

14. The method of clause 13, wherein the first interface type comprises only a Small Computer System Interface (SCSI) and the second interface type comprises the SCSI and a Human Interface Device (HID) interface.

15. The method of clause 13, wherein the first interface type only allows an administrator user to unlock the device and prevents unlocking of the device by a non-administrator user.

16. The method of clause 15, wherein the second interface type allows the non-administrator user to unlock the device.

17. The method of clause 13, wherein the device comprises a Universal Serial Bus (USB) device, and the at least one of the string descriptor requests associated with switching the interface of the device comprises string descriptor requests for index 4, 5 and 6, wherein the index 4, 5 and 6 are distinct from each other and sequential.

18. The method of clause 17, further comprising:
monitoring for a response from the device in response to the string descriptor request for index 4; and
determining whether the response from the device comprises a pre-defined string confirming that the device is a specific type of device.

19. The method of clause 18, wherein the specific type of device is a U3 storage device.

20. The method of clause 18, further comprising:
if the response from the device comprises the pre-defined string, then performing the steps of:
monitoring for the string descriptor requests for index 5 and 6; and
intercepting the string descriptor requests for index 5 and 6.

21. The method of clause 13, further comprising:
after the interface of the device is switched to the second interface type, performing the steps of:
receiving an unlocking command for the device from the secure application; and
sending the unlocking command from the server to the client over the network.

22. The method of clause 13, wherein the at least another one of the string descriptor requests to be handled by the virtual bus driver comprises string descriptor requests for index 1, 2 and 3, wherein the index 1, 2 and 3 are distinct from each other and sequential.

23. The method of clause 13, wherein the portion of the device information comprises at least one of a product identification (ID) and a vendor identification (ID) for the device.

24. The method of clause 13, wherein the at least another one of the string descriptor requests to be handled by the virtual bus driver is prevented from being sent to the client.

Figure 8B:
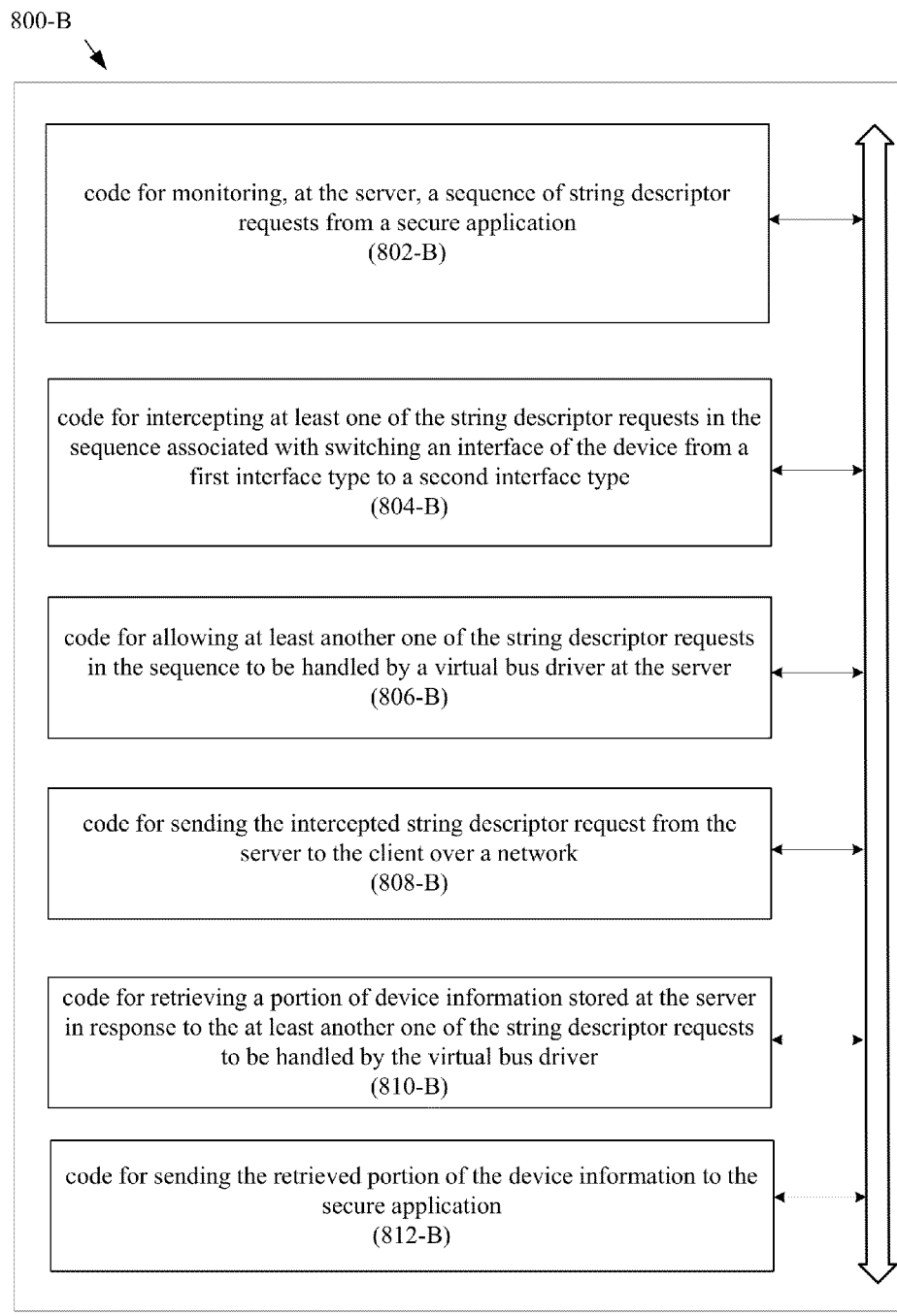
FIG. 8B is a block diagram representing code of an example of a machine-readable storage medium encoded with instructions executable by a processor to perform a method for unlocking a device remotely from a server, wherein the device is connected locally to a client, and the server is remote to the client and the device, in accordance with various aspects of the subject technology.

25. A machine-readable storage medium (see, e.g., machine-readable storage medium 800-B of FIG. 8B) encoded with instructions executable by a processing system to perform a method for unlocking a device (e.g., device 240 of FIG. 4) remotely from a server (e.g., server 104 of FIG. 4), wherein the device is connected locally to a client (e.g., client 102 of FIG. 4), and the server is remote to the client and the device, the instructions comprising code for:
monitoring, at the server, a sequence of string descriptor requests from a secure application (e.g., secure application 470 of FIG. 4) (see, e.g., item 802-B of FIG. 8B);
intercepting at least one of the string descriptor requests in the sequence associated with switching an interface of the device from a first interface type to a second interface type (see, e.g., item 804-B of FIG. 8B);
allowing at least another one of the string descriptor requests in the sequence to be handled by a virtual bus driver (e.g., virtual bus driver 260 of FIG. 4) at the server (see, e.g., item 806-B of FIG. 8B);
sending the intercepted string descriptor request from the server to the client over a network (see, e.g., item 808-B of FIG. 8B);
retrieving a portion of device information stored at the server in response to the at least another one of the string descriptor requests to be handled by the virtual bus driver (see, e.g., item 810-B of FIG. 8B); and
sending the retrieved portion of the device information to the secure application (see, e.g., item 812-B of FIG. 8B).

26. The machine-readable storage medium of clause 25, wherein the first interface type comprises only a Small Computer System Interface (SCSI) and the second interface type comprises the SCSI and a Human Interface Device (HID) interface.

27. The machine-readable storage medium of clause 25, wherein the first interface type only allows an administrator user to unlock the device and prevents unlocking of the device by a non-administrator user.

28. The machine-readable storage medium of clause 27, wherein the second interface type allows the non-administrator user to unlock the device.

29. The machine-readable storage medium of clause 25, wherein the device comprises a Universal Serial Bus (USB) device, and the at least one of the string descriptor requests associated with switching the interface of the device comprises string descriptor requests for index 4, 5 and 6, wherein the index 4, 5 and 6 are distinct from each other and sequential.

30. The machine-readable storage medium of clause 29, wherein the instructions further comprise code for:
monitoring for a response from the device in response to the string descriptor request for index 4; and
determining whether the response from the device comprises a pre-defined string confirming that the device is a specific type of device.

31. The machine-readable storage medium of clause 30, wherein the specific type of device is a U3 storage device.

32. The machine-readable storage medium of clause 30, wherein the instructions further comprise code for:
if the response from the device comprises the pre-defined string, then performing the steps of:
monitoring for the string descriptor requests for index 5 and 6; and
intercepting the string descriptor requests for index 5 and 6.

33. The machine-readable storage medium of clause 25, wherein the instructions further comprise code for:
after the interface of the device is switched to the second interface type, performing the steps of:
receiving an unlocking command for the device from the secure application; and
sending the unlocking command from the server to the client over the network.

34. The machine-readable storage medium of clause 25, wherein the at least another one of the string descriptor requests to be handled by the virtual bus comprises string descriptor requests for index 1, 2 and 3, wherein the index 1, 2 and 3 are distinct from each other and sequential.

35. The machine-readable storage medium of clause 25, wherein the portion of the device information comprises at least one of a product identification (ID) and a vendor identification (ID) for the device.

36. The machine-readable storage medium of clause 25, wherein the at least another one of the string descriptor requests to be handled by the virtual bus driver is prevented from being sent to the client.

Figure 8C:
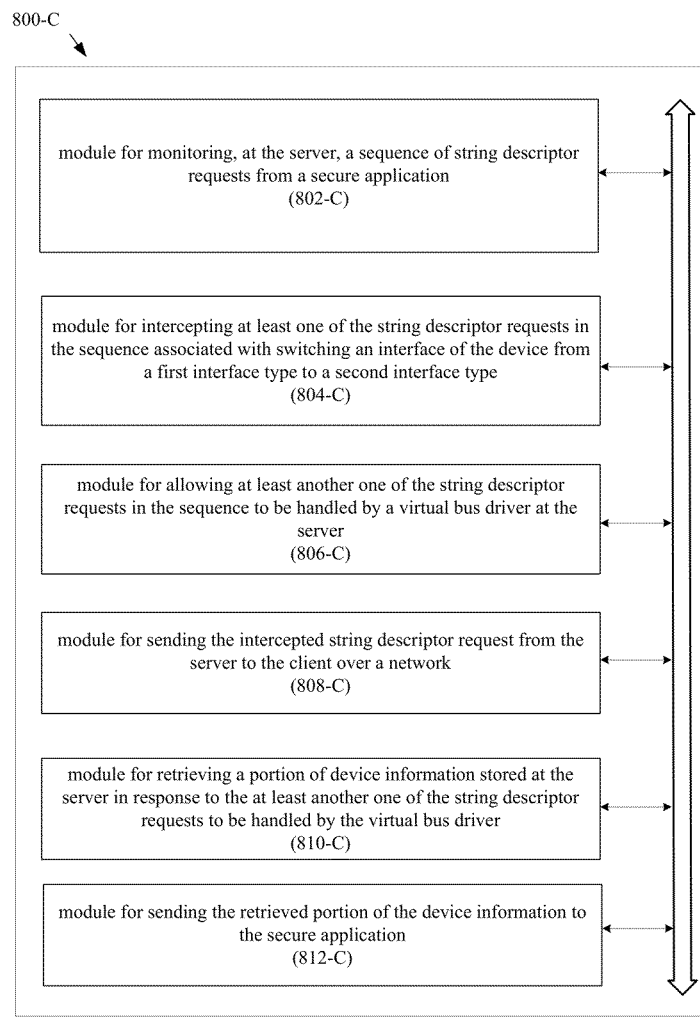
FIG. 8C is a block diagram representing an example of an apparatus for unlocking a device remotely from a server, wherein the device is connected locally to a client, and the server is remote to the client and the device, in accordance with various aspects of the subject technology.

37. An apparatus (see, e.g., apparatus 800-C of FIG. 8C) for unlocking a device (e.g., device 240 of FIG. 4) remotely from a server (e.g., server 104 of FIG. 4), wherein the device is connected locally to a client (e.g., client 102 of FIG. 4), and the server is remote to the client and the device, the apparatus comprising:

means for monitoring, at the server, a sequence of string descriptor requests from a secure application (e.g., secure application 470 of FIG. 4) (see, e.g., item 802-C of FIG. 8C);

means for intercepting at least one of the string descriptor requests in the sequence associated with switching an interface of the device from a first interface type to a second interface type (see, e.g., item 804-C of FIG. 8C);

means for allowing at least another one of the string descriptor requests in the sequence to be handled by a virtual bus driver (e.g., virtual bus driver 260 of FIG. 4) at the server (see, e.g., item 806-C of FIG. 8C);

means for sending the intercepted string descriptor request from the server to the client over a network (see, e.g., item 808-C of FIG. 8C);

means for retrieving a portion of device information stored at the server in response to the at least another one of the string descriptor requests to be handled by the virtual bus driver (see, e.g., item 810-C of FIG. 8C); and means for sending the retrieved portion of the device information to the secure application (see, e.g., item 812-C of FIG. 8C).

38. The apparatus of clause 37, wherein the first interface type comprises only a Small Computer System Interface (SCSI) and the second interface type comprises the SCSI and a Human Interface Device (HID) interface.

39. The apparatus of clause 37, wherein the first interface type only allows an administrator user to unlock the device and prevents unlocking of the device by a non-administrator user.

40. The apparatus of clause 39, wherein the second interface type allows the non-administrator user to unlock the device.

41. The apparatus of clause 36, wherein the device comprises a Universal Serial Bus (USB) device, and the at least one of the string descriptor requests associated with switching the interface of the device comprises string descriptor requests for index 4, 5 and 6, wherein the index 4, 5 and 6 are distinct from each other and sequential.

42. The apparatus of clause 41, further comprising: means for monitoring for a response from the device in response to the string descriptor request for index 4; and means for determining whether the response from the device comprises a pre-defined string confirming that the device is a specific type of device.

43. The apparatus of clause 42, wherein the specific type of device is a U3 storage device.

44. The apparatus of clause 42, further comprising:

if the response from the device comprises the pre-defined string, then performing the steps of:

means for monitoring for the string descriptor requests for index 5 and 6; and means for intercepting the string descriptor requests for index 5 and 6.

45. The apparatus of clause 37, further comprising:

after the interface of the device is switched to the second interface type, means for receiving an unlocking command for the device from the secure application; and means for sending the unlocking command from the server to the client over the network.

46. The apparatus of clause 37, wherein the at least another one of the string descriptor requests to be handled by the virtual bus comprises string descriptor requests for index 1, 2 and 3, wherein the index 1, 2 and 3 are distinct from each other and sequential.

47. The apparatus of clause 37, wherein the portion of the device information comprises at least one of a product identification (ID) and a vendor identification (ID) for the device.

48. The apparatus of clause 37, wherein the at least another one of the string descriptor requests to be handled by the virtual bus driver is prevented from being sent to the client.

Illustration of System/Method/Machine-Readable Medium/Apparatus for facilitating unlocking a device connected locally to a client, utilizing a server located remotely from the client and the device, wherein the device comprises an interface, a system partition and a secure data partition (described as clauses)

The subject technology is illustrated, for example, according to various aspects described below. Various examples of aspects of the subject technology are described as numbered clauses (1, 2, 3, etc.) for convenience. These are provided as examples, and do not limit the subject technology. It is noted that any of the dependent clauses may be combined in any combination, and placed into a respective independent clause, e.g., clause 49, 60, 71 and 82. The other clauses can be presented in a similar manner.

49. A system for facilitating unlocking a device (e.g., device 240 of FIG. 4) connected locally to a client (e.g., client 102 of FIG. 4), utilizing a server (e.g., server 104 of FIG. 4) located remotely from the client and the device, wherein the device comprises an interface, a system partition and a secure data partition, comprising:

a stub driver (e.g., stub driver 220 of FIG. 4) configured to receive a secure application from the system partition of the device; and a proxy (e.g., proxy 210 of FIG. 4) configured to send the secure application from the stub driver to the server over a network, configured to receive, at the client, at least one string descriptor request from the server over the network, wherein the at least one string descriptor request is associated with switching the interface of the device from a first interface type to a second interface type, and, after the interface of the device is switched to the second interface type, configured to receive, at the client, an unlocking command from the server over the network, wherein the stub driver is further configured to direct the at least one string descriptor request received by the proxy to the device, and to direct the unlocking command received by the proxy to the device, wherein the interface of the device is configured to unlock the secure data partition of the device if the interface accepts the unlocking command.

50. The system of clause 49, wherein the first interface type comprises only a Small Computer System Interface (SCSI) and the second interface type comprises the SCSI and a Human Interface Device (HID) interface.

51. The system of clause 49, wherein the first interface type only allows an administrator user to unlock the device and prevents a non-administrator user from unlocking the device.

52. The system of clause 51, wherein the second interface type allows the non-administrator user to unlock the device.

53. The system of clause 49, wherein the device comprises a Universal Serial Bus (USB) device, and the at least one string descriptor request comprises string descriptor requests for index 4, 5 and 6, wherein index 4, 5 and 6 are distinct from each other and sequential.

54. The system of clause 53, wherein the stub driver is configured to receive a response from the device in response to the string descriptor request for index 4, wherein the response comprises a string identifying the device as a specific type of device, and to direct the response to the proxy, and the proxy is configured to send the response to the server over the network.

55. The system of clause 54, wherein the specific type of device is a U3 storage device.

56. The system of clause 54, wherein, after sending the response, the proxy is configured to receive, at the client, the string descriptor requests for index 5 and 6 from the server over the network, and wherein the stub driver is configured to direct the string descriptor requests for index 5 and 6 from the proxy to the device.

57. The system of clause 53, wherein the proxy is prevented from receiving any of string descriptor requests for index 1, 2 and 3 from the server, wherein the index 1, 2 and 3 are distinct from each other and sequential.

58. The system of clause 49, wherein, the stub driver is configured to receive device information from the interface of the device, and to direct the received device information to the proxy, and wherein the proxy is configured to send the device information to the server over the network.

59. The system of clause 58, wherein the device comprises a Universal Serial Bus (USB) device, and the device information comprises at least one of a device descriptor, a configuration descriptor, an interface descriptor, an endpoint descriptor and a string descriptor.

Figure 9A:
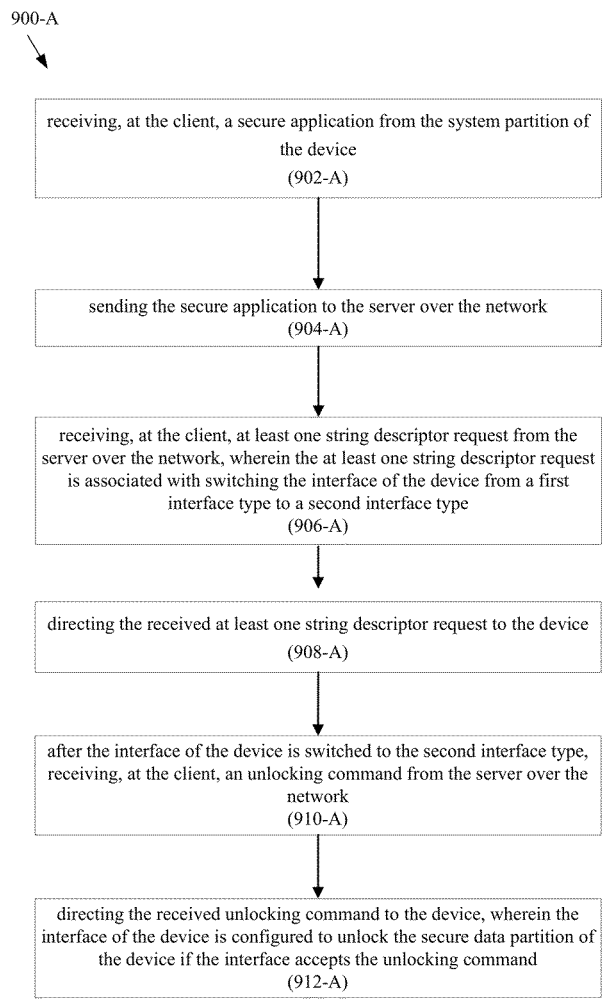
FIG. 9A is a block diagram representing an example of a method for facilitating unlocking a device connected locally to a client, utilizing a server located remotely from the client and the device, wherein the device comprises an interface, a system partition and a secure data partition, in accordance with various aspects of the subject technology.

60. A method (see, e.g., method 900-A of FIG. 9A) for facilitating unlocking a device (e.g., device 240 of FIG. 4) connected locally to a client (e.g., client 102 of FIG. 4), utilizing a server (e.g., server 104 of FIG. 4) located remotely from the client and the device, wherein the device comprises an interface, a system partition and a secure data partition, the method comprising:

receiving, at the client, a secure application from the system partition of the device (see, e.g., item 902-A of FIG. 9A);

sending the secure application to the server over the network (see, e.g., item 904-A of FIG. 9A);

receiving, at the client, at least one string descriptor request from the server over the network, wherein the at least one string descriptor request is associated with switching the interface of the device from a first interface type to a second interface type (see, e.g., item 906-A of FIG. 9A);

directing the received at least one string descriptor request to the device (see, e.g., item 908-A of FIG. 9A);

after the interface of the device is switched to the second interface type, receiving, at the client, an unlocking command from the server over the network (see, e.g., item 910-A of FIG. 9A); and directing the received unlocking command to the device, wherein the interface of the device is configured to unlock the secure data partition of the device if the interface accepts the unlocking command (see, e.g., item 912-A of FIG. 9A).

61. The method of clause 60, wherein the first interface type comprises only a Small Computer System Interface (SCSI) and the second interface type comprises the SCSI and a Human Interface Device (HID) interface.

62. The method of clause 60, wherein the first interface type only allows an administrator user to unlock the device and prevents a non-administrator user from unlocking the device.

63. The method of clause 62, wherein the second interface type allows the non-administrator user to unlock the device.

64. The method of clause 60, wherein the device comprises a Universal Serial Bus (USB) device, and the at least one string descriptor request comprises string descriptor requests for index 4, 5 and 6, wherein the index 4, 5 and 6 are distinct from each other and sequential.

65. The method of clause 64, further comprising:

receiving a response from the device in response to the string descriptor request for index 4, wherein the response comprises a string identifying the device as a specific type of device; and sending the response to the server over the network.

66. The method of clause 65, wherein the specific type of device is a U3 storage device.

67. The method of clause 65, further comprising:

after sending the response, receiving, at the client, the string descriptor requests for index 5 and 6 from the server over the network; and directing the string descriptor requests for index 5 and 6 to the device.

68. The method of clause 64, wherein the client is prevented from receiving any of string descriptor requests for index 1, 2 and 3 from the server, wherein the index 1, 2 and 3 are distinct from each other and sequential.

69. The method of clause 60, further comprising:

receiving device information from the device; and sending the device information to the server over the network.

70. The method of clause 69, wherein the device comprises a Universal Serial Bus (USB) device and the device information comprises at least one of a device descriptor, a configuration descriptor, an interface descriptor, an endpoint descriptor and a string descriptor.

Figure 9B:
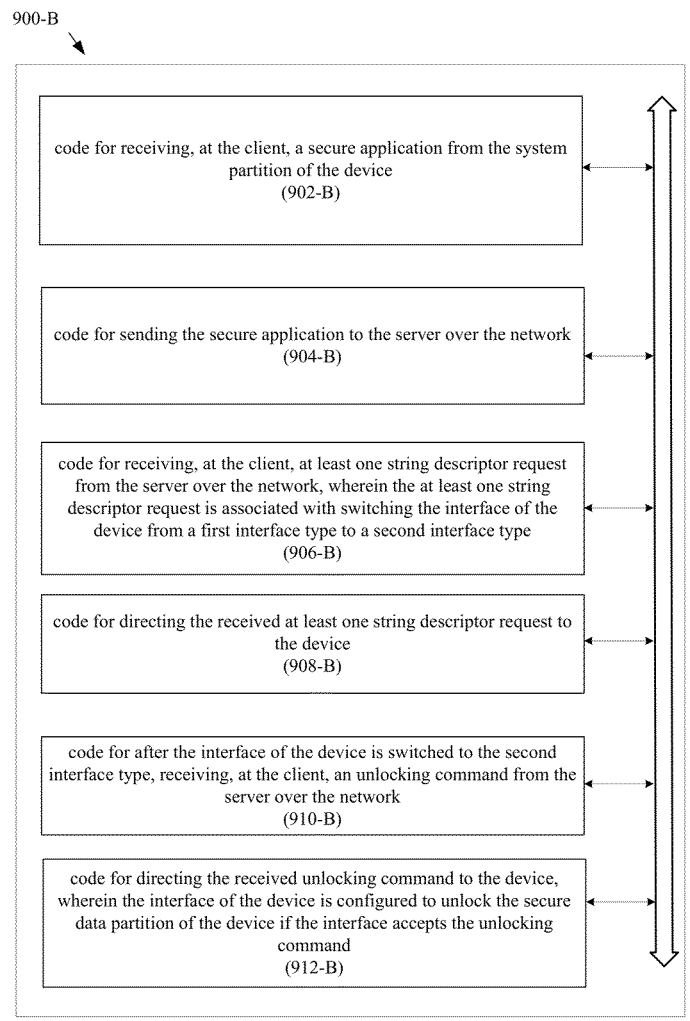
FIG. 9B is a block diagram representing code of an example of a machine-readable storage medium encoded with instructions executable by a processor to perform a method for facilitating unlocking a device connected locally to a client, utilizing a server located remotely from the client and the device, wherein the device comprises an interface, a system partition and a secure data partition, in accordance with various aspects of the subject technology.

71. A machine-readable storage medium (see, e.g., machine-readable storage medium 900-B of FIG. 9B) encoded with instructions executable by a processing system to perform a method for facilitating unlocking a device (e.g., device 240 of FIG. 4) connected locally to a client (e.g., client 102 of FIG. 4), utilizing a server (e.g., server 104 of FIG. 4) located remotely from the client and the device, wherein the device comprises an interface, a system partition and a secure data partition, the instructions comprising code for:

receiving, at the client, a secure application from the system partition of the device (see, e.g., item 902-B of FIG. 9B);

sending the secure application to the server over the network (see, e.g., item 904-B of FIG. 9B);

receiving, at the client, at least one string descriptor request from the server over the network, wherein the at least one string descriptor request is associated with switching the interface of the device from a first interface type to a second interface type (see, e.g., item 906-B of FIG. 9B);

directing the received at least one string descriptor request to the device (see, e.g., item 908-B of FIG. 9B);

after the interface of the device is switched to the second interface type, receiving, at the client, an unlocking command from the server over the network (see, e.g., item 910-B of FIG. 9B); and directing the received unlocking command to the device, wherein the interface of the device is configured to unlock the secure data partition of the device if the interface accepts the unlocking command (see, e.g., item 912-B of FIG. 9B).

72. The machine-readable storage medium of clause 71, wherein the first interface type comprises only a Small Computer System Interface (SCSI) and the second interface type comprises the SCSI and a Human Interface Device (HID) interface.

73. The machine-readable storage medium of clause 71, wherein the first interface type only allows an administrator user to unlock the device and prevents a non-administrator user from unlocking the device.

74. The machine-readable storage medium of clause 73, wherein the second interface type allows the non-administrator user to unlock the device.

75. The machine-readable storage medium of clause 71, wherein the device comprises a Universal Serial Bus (USB) device, and the at least one string descriptor request comprises string descriptor requests for index 4, 5 and 6, wherein the index 4, 5 and 6 are distinct from each other and sequential.

76. The machine-readable storage medium of clause 75, wherein the instructions further comprise code for:

receiving a response from the device in response to the string descriptor request for index 4, wherein the response comprises a string identifying the device as a specific type of device; and sending the response to the server over the network.

77. The machine-readable storage medium of clause 76, wherein the specific type of device is a U3 storage device.

78. The machine-readable storage medium of clause 76, wherein the instructions further comprise code for:

after sending the response, receiving, at the client, the string descriptor requests for index 5 and 6 from the server over the network; and directing the string descriptor requests for index 5 and 6 to the device.

79. The machine-readable storage medium of clause 75, wherein the client is prevented from receiving any of string descriptor requests for index 1, 2 and 3 from the server, wherein the index 1, 2 and 3 are distinct from each other and sequential.

80. The machine-readable storage medium of clause 71, wherein the instructions further comprise code for:

receiving device information from the device; and sending the device information to the server over the network.

81. The machine-readable storage medium of clause 80, wherein the device comprises a Universal Serial Bus (USB) device and the device information comprises at least one of a device descriptor, a configuration descriptor, an interface descriptor, an endpoint descriptor and a string descriptor.

Figure 9C:
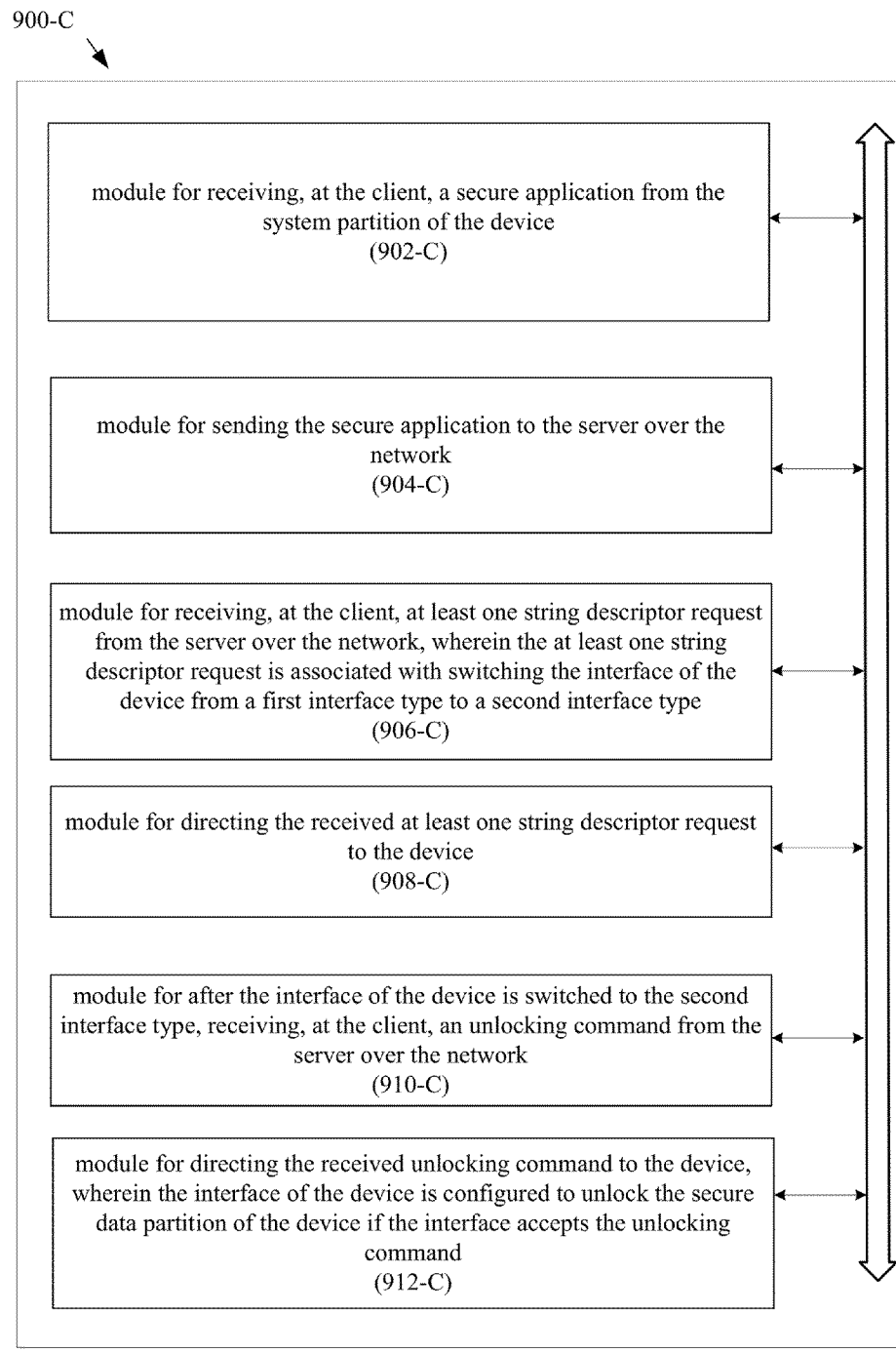
FIG. 9C is a block diagram representing an example of an apparatus for facilitating unlocking a device connected locally to a client, utilizing a server located remotely from the client and the device, wherein the device comprises an interface, a system partition and a secure data partition, in accordance with various aspects of the subject technology.

82. An apparatus (see, e.g., apparatus 900-C of FIG. 9C) for facilitating unlocking a device (e.g., device 240 of FIG. 4) connected locally to a client (e.g., client 102 of FIG. 4), utilizing a server (e.g., server 104 of FIG. 4) located remotely from the client and the device, wherein the device comprises an interface, a system partition and a secure data partition, the apparatus comprising:

means for receiving, at the client, a secure application from the system partition of the device (see, e.g., item 902-C of FIG. 9C);

means for sending the secure application to the server over the network (see, e.g., item 904-C of FIG. 9C);

means for receiving, at the client, at least one string descriptor request from the server over the network, wherein the at least one string descriptor request is associated with switching the interface of the device from a first interface type to a second interface type (see, e.g., item 906-C of FIG. 9C);

means for directing the received at least one string descriptor request to the device (see, e.g., item 908-C of FIG. 9C);

after the interface of the device is switched to the second interface type, means for receiving, at the client, an unlocking command from the server over the network (see, e.g., item 910-C of FIG. 9C); and means for directing the received unlocking command to the device, wherein the interface of the device is configured to unlock the secure data partition of the device if the interface accepts the unlocking command (see, e.g., item 912-C of FIG. 9C).

83. The apparatus of clause 82, wherein the first interface type comprises only a Small Computer System Interface (SCSI) and the second interface type comprises the SCSI and a Human Interface Device (HID) interface.

84. The apparatus of clause 82, wherein the first interface type only allows an administrator user to unlock the device and prevents a non-administrator user from unlocking the device.

85. The apparatus of clause 84, wherein the second interface type allows the non-administrator user to unlock the device.

86. The apparatus of clause 82, wherein the device comprises a Universal Serial Bus (USB) device, and the at least one string descriptor request comprises string descriptor requests for index 4, 5 and 6, wherein the index 4, 5 and 6 are distinct from each other and sequential.

87. The apparatus of clause 86, further comprising:

means for receiving a response from the device in response to the string descriptor request for index 4, wherein the response comprises a string identifying the device as a specific type of device; and means for sending the response to the server over the network.

88. The apparatus of clause 87, wherein the specific type of device is a U3 storage device.

89. The apparatus of clause 87, further comprising:

means for after sending the response, receiving, at the client, the string descriptor requests for index 5 and 6 from the server over the network; and means for directing the string descriptor requests for index 5 and 6 to the device.

90. The apparatus of clause 86, wherein the client is prevented from receiving any of string descriptor requests for index 1, 2 and 3 from the server, wherein the index 1, 2 and 3 are distinct from each other and sequential.

91. The apparatus of clause 82, further comprising:

means for receiving device information from the device; and means for sending the device information to the server over the network.

92. The apparatus of clause 91, wherein the device comprises a Universal Serial Bus (USB) device and the device information comprises at least one of a device descriptor, a configuration descriptor, an interface descriptor, an endpoint descriptor and a string descriptor.

93. A processor comprising one or more modules configured to perform the method or function described in any one of the foregoing clauses (e.g., clauses 1-92).

94. A machine-readable storage medium encoded with instructions executable by a processing system to perform the method or function described in any one of the foregoing clauses (e.g., clauses 1-92).

95. A machine-readable storage medium comprising code for causing a client or a server to perform the method or function described in any one of the foregoing clauses (e.g., clauses 1-92).

96. The machine-readable storage medium of clause 94 of 95, wherein the client or the processing system comprises the machine-readable storage medium.

97. An apparatus comprising means for performing the method or function described in any one of the foregoing clauses (e.g., clauses 1-92).

98. An apparatus of any one of the foregoing clauses (e.g., clauses 1-92), wherein the apparatus comprises a processing system and a memory.

99. An apparatus comprising components operable to perform the method or function described in any one of the foregoing clauses (e.g., clauses 1-92).

100. The apparatus of any of clauses 42-48, wherein the apparatus is the server.

101. The apparatus of any of clauses 82-92, wherein the apparatus is the client.

In one aspect, any of the foregoing clauses may depend from any one of the foregoing independent clauses or any one of the foregoing dependent clauses. In one aspect, any of the clauses may be combined with any other clauses. In one aspect, the methods, means and modules (e.g., software modules or hardware modules) described above can be represented in drawings.

Those of skill in the art would appreciate that the various illustrative blocks, modules, elements, components, methods, and algorithms described herein may be implemented as electronic hardware, computer software, or combinations of both.

For example, a module may be implemented as electronic hardware, computer software, or combinations of both. In one aspect, a module(s) may be an apparatus since a module(s) may include instructions encoded or stored on a machine-readable medium, on another device, or on a portion thereof. In one aspect, a module(s) may be software (e.g., an application, a subroutine) stored in a machine-readable medium and executable by a processing system or a processor. In another aspect, a module(s) may be hardware (e.g., machine-readable medium encoded with instructions, a pre-programmed general-purpose computer, or a special purpose electronic or optical device).

Various modules may reside in one machine or in multiple machines. In one example, modules for the server side (e.g., an agent, a secure application, a remote unlocking module, virtual bus driver, etc.) may be located in one server or spread over multiple servers. In another example, modules for the client side (e.g., a proxy, a stub driver, a bus driver, etc.) may be located in one client device or spread over multiple client devices.

In one aspect of the disclosure, when actions or functions are described as being performed by a module or a component (e.g., establishing, sending, receiving, providing, building, displaying, registering, encrypting, decrypting, authenticating, notifying, accepting, selecting, controlling, issuing, transmitting, reporting, pushing, or any other action or function), it is understood that such actions or functions are performed by the module or the component directly or indirectly. As an example, when a module is described as performing an action, it is understood that the module may perform the action directly or may perform the action indirectly, for example, by facilitating such an action. For instance, when a session is described as being established by a module, it is understood that the module may establish the session indirectly by facilitating an establishment of the session. As yet another example, when a view of an application is described as being displayed or rendered by a module, it is understood that the view may be displayed or rendered by the module either directly or indirectly.

To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

Various components and blocks may be arranged differently (e.g., arranged in a different order, or partitioned in a different way) all without departing from the scope of the subject technology. In one aspect of the disclosure, the modules (or elements) recited in the accompanying claims may be performed by one module or by a smaller number of modules, and this arrangement is within the scope of the claims. In another aspect, the modules (or elements) recited in the accompanying claims may be performed by a larger number of modules, and this arrangement is within the scope of the claims. In yet another aspect, a module (or an element) recited in the accompanying claims may be performed by multiple modules, and this arrangement is within the scope of the claims. For example, a local view module and a remote view module may be combined into one module. A client remote access module, a local view module and a remote view module may be combined into one module. An agent module and a server remote access module may be combined into one module. In another example, these modules may be divided into a larger number of modules.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for unlocking a device remotely from a server, wherein the device is connected locally to a client, and the server is remote to the client and the device, comprising:
   a processor;
   a virtual bus driver;
   a remote unlocking module configured to:
      monitor, at the server, a sequence of string descriptor requests from a secure application;
      intercept at least one of the string descriptor requests in the sequence associated with switching an interface of the device from a first interface type to a second interface type, wherein the first interface type allows an administrator user to unlock the device and prevents a non-administrator user from unlocking the device; and
      allow at least another one of the string descriptor requests in the sequence to be handled by the virtual bus driver; and
   an agent configured to receive the intercepted at least one of the string descriptor requests, and to send the intercepted at least one of the string descriptor requests from the server to the client over a network;
   wherein the virtual bus driver is configured to retrieve a portion of device information stored at the server in response to the at least another one of the string descriptor requests, and to send the retrieved portion of the device information to the secure application.

2. The system of claim 1, wherein the first interface type comprises only a Small Computer System Interface (SCSI) and the second interface type comprises the SCSI and a Human Interface Device (HID) interface.

3. The system of claim 1, wherein the second interface type allows the non-administrator user to unlock the device.

4. The system of claim 1, wherein the device comprises a Universal Serial Bus (USB) device, and the at least one of the string descriptor requests associated with switching the interface of the device comprises string descriptor requests for index 4, 5 and 6, wherein the index 4, 5 and 6 are distinct from each other and sequential.

5. The system of claim 4, wherein the remote unlocking module is further configured to monitor for a response from the device in response to the string descriptor request for index 4, and to determine whether the response from the device comprises a pre-defined string confirming that the device is a specific type of device.

6. The system of claim 5, wherein the specific type of device is a U3 storage device.

7. The system of claim 5, wherein, if the remote unlocking module determines that the response from the device comprises the pre-defined string, then the remote unlocking module is further configured to monitor for the string descriptor requests for index 5 and 6, and to intercept the string descriptor requests for index 5 and 6.

8. The system of claim 1, wherein, after the interface of the device is switched to the second interface type, the virtual bus driver is configured to receive an unlocking command for the device from the secure application, and to provide the unlocking command to the agent, and wherein the agent is further configured to send the unlocking command from the server to the client over the network.

9. The system of claim 1, wherein the at least another one of the string descriptor requests handled by the virtual bus driver comprises string descriptor requests for index 1, 2 and 3, wherein the index 1, 2 and 3 are distinct from each other and sequential.

10. The system of claim 1, wherein the portion of the device information comprises at least one of a product identification (ID) and a vendor identification (ID) for the device.

11. The system of claim 1, wherein the at least another one of the string descriptor requests handled by the virtual bus driver is prevented from being sent to the client.

12. A method for unlocking a device remotely from a server, wherein the device is connected locally to a client, and the server is remote to the client and the device, comprising:
   monitoring, at the server, a sequence of string descriptor requests from a secure application;
   intercepting at least one of the string descriptor requests in the sequence associated with switching an interface of the device from a first interface type to a second interface type, the first interface type allowing an administrator user to unlock the device and preventing a non-administrator user from unlocking the device;
   allowing at least another one of the string descriptor requests in the sequence to be handled by a virtual bus driver at the server;
   sending the intercepted string descriptor request from the server to the client over a network;
   retrieving a portion of device information stored at the server in response to the at least another one of the string descriptor requests to be handled by the virtual bus driver; and
   sending the retrieved portion of the device information to the secure application.

13. A non-transitory machine-readable storage medium encoded with instructions executable by a processing system to perform a method for unlocking a device remotely from a server, wherein the device is connected locally to a client, and the server is remote to the client and the device, the instructions operable, when executed by a processor, to:
   monitor, at the server, a sequence of string descriptor requests from a secure application;
   intercept at least one of the string descriptor requests in the sequence associated with switching an interface of the device from a first interface type to a second interface type, the first interface type allowing an administrator user to unlock the device and preventing a non-administrator user from unlocking the device;

allow at least another one of the string descriptor requests in the sequence to be handled by a virtual bus driver at the server;

send the intercepted string descriptor request from the server to the client over a network;

retrieve a portion of device information stored at the server in response to the at least another one of the string descriptor requests to be handled by the virtual bus driver; and send the retrieved portion of the device information to the secure application.

* * * * *